US012738677B2

(12) United States Patent
Wenig et al.

(10) Patent No.: US 12,738,677 B2
(45) Date of Patent: Sep. 15, 2026

(54) CONDUCTOR CONNECTING MODULE HAVING A CONTACT ELEMENT FOR SOLDERING ON A PRINTED CIRCUIT BOARD

(71) Applicant: WAGO Verwaltungsgesellschaft mbH, Minden (DE)

(72) Inventors: Fabian Wenig, Artern (DE); Jens Froebing, Gotha (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 318 days.

(21) Appl. No.: 18/531,230

(22) Filed: Dec. 6, 2023

(65) Prior Publication Data

US 2024/0195093 A1 Jun. 13, 2024

(30) Foreign Application Priority Data

Dec. 8, 2022 (DE) ..................... 10 2022 132 682.9

(51) Int. Cl.
*H01R 12/70* (2011.01)
*H01R 4/48* (2006.01)

(52) U.S. Cl.
CPC ......... *H01R 12/707* (2013.01); *H01R 4/4848* (2023.08)

(58) Field of Classification Search
CPC .................................................... H01R 12/707
USPC ......................................... 439/441, 629, 717
See application file for complete search history.

(56) References Cited

U.S. PATENT DOCUMENTS

| | | | | |
|---|---|---|---|---|
| 5,494,456 A * | 2/1996 | Kozel | H01R 4/4821 | 439/441 |
| 5,876,237 A * | 3/1999 | Patel | H01R 43/20 | 439/441 |
| 6,074,242 A * | 6/2000 | Stefaniu | H01R 4/4848 | 439/441 |
| 8,262,422 B1 * | 9/2012 | Chiang | H01R 4/483 | 439/441 |

(Continued)

FOREIGN PATENT DOCUMENTS

| | | |
|---|---|---|
| CN | 111987489 A | 11/2020 |
| DE | 102006018129 A1 | 11/2007 |

(Continued)

*Primary Examiner* — Hae Moon Hyeon
(74) *Attorney, Agent, or Firm* — Muncy, Geissler, Olds & Lowe, P.C.

(57) ABSTRACT

A conductor connecting module including an insulating housing and a contact insert arranged in the insulating housing. The contact insert having a busbar and a clamping spring. A contact element having a solder connection contact surface is arranged on the busbar and the solder connection contact surface is able to be soldered on a printed circuit board. The busbar a frame-shaped busbar that has a contact section and a holding section, which are formed opposite each other. The contact section and the holding section are connected to each other via a connecting section. The clamping spring has a contact leg for contact with the holding section and a clamping leg, the clamping leg and the contact section forming a clamping point for the electrical conductor to be clamped. At least one contact element is arranged on the holding section and/or on the connecting section and/or on the contact section.

18 Claims, 28 Drawing Sheets

(56) References Cited

U.S. PATENT DOCUMENTS

| | | | | |
|---|---|---|---|---|
| 8,485,841 | B2 * | 7/2013 | Schrader | H01R 4/4821 439/441 |
| 8,882,533 | B2 * | 11/2014 | Brandberg | H01R 4/4833 439/441 |
| 9,276,331 | B2 | 3/2016 | Stadler et al. | |
| 9,680,237 | B2 | 6/2017 | Aporius et al. | |
| 10,446,945 | B2 | 10/2019 | Wu et al. | |
| 2011/0312220 | A1 * | 12/2011 | Zhu | H01R 13/2464 439/626 |

FOREIGN PATENT DOCUMENTS

| | | | |
|---|---|---|---|
| DE | 202011104301 | U1 | 9/2011 |
| DE | 202013101582 | U1 | 7/2014 |
| DE | 102014200271 | A1 | 7/2015 |
| DE | 102014117062 | A1 | 5/2016 |
| DE | 202016008242 | U1 | 5/2017 |
| DE | 202020102539 | U1 | 8/2021 |

* cited by examiner

CONDUCTOR CONNECTING MODULE HAVING A CONTACT ELEMENT FOR SOLDERING ON A PRINTED CIRCUIT BOARD

This nonprovisional application claims priority under 35 U.S.C. § 119(a) to German Patent Application No. 10 2022 132 682.9, which was filed in Germany on Dec. 8, 2022, and which is herein incorporated by reference.

BACKGROUND OF THE INVENTION

Field of the Invention

The invention relates to a conductor connecting module, including an insulating housing and a contact insert arranged in the insulating housing, the contact insert having a busbar and a clamping spring, at least one contact element having a solder connection contact surface being arranged on the busbar, the solder connection contact surface being able to be soldered on a printed circuit board.

SUMMARY OF THE INVENTION

It is therefore an the object of the present invention is to provide an improved conductor connecting module.

Thus, it is proposed that the busbar can be designed as a frame-shaped busbar, the frame-shaped busbar having a contact section and a holding section, which are formed opposite each other, the contact section and the holding section being connected to each other via a connecting section, the clamping spring having a contact leg for contact with the holding section and a clamping leg, the clamping leg and the contact section forming a clamping point for the electrical conductor to be clamped, at least one contact element being arranged on the holding section and/or on the contact section, and the solder connection contact surface of the contact element protruding from an opening of the insulating housing.

This has the advantage that a compact conductor connecting module may be provided, which may be soldered to a printed circuit board via the solder connection contact surface without removing the insulating housing.

A contact element may be arranged in each case on the holding section and on the contact section and protrude in each case from an opening in the insulating housing. In this way, the electrically conductive contacting of the conductor connecting module on a printed circuit board may be further improved. The solder connection contact surfaces of the contact elements may also be advantageously oriented in parallel to each other.

The contact element may extend out of the opening of the insulating housing in an extension of the holding section and/or the contact section. In this way, corresponding contact sections may be provided in a simple structural manner.

The holding section and/or the contact section and the contact elements may be designed to form a single piece. The contact element then advantageously extends in the same plane spanned by the particular holding section and/or contact section.

Further, in a one-piece design, an offset between the holding/contact section and the contact element is possible.

A front side of the contact element may be designed as the solder connection contact surface.

The thickness of the contact element can correspond to the width of the solder connection contact surfaces. The length of the solder connection contact surfaces corresponds essentially to the length of the contact element protruding from the holding section and/or contact section.

The solder connection contact surface of the contact element may have an essentially flat contact surface for Surface Mount Device (SMD) soldering on the printed circuit board.

The busbar may be provided with a U-shaped design. A U-shaped design may also comprise similar shapes, such as a V-shaped or C-shaped design. The busbar may form a clamping cage, in which the clamping spring is clamped.

The clamping leg of the clamping spring may transition into a spring bend, the spring bend extending to the contact leg for contact with the holding section of the busbar, the clamping spring being provided with a V-shaped design.

The insulating housing may have a first set-back portion on the side of the insulating housing on which the opening can be arranged, the printed circuit board being able to be arranged on the first set-back portion.

A set-back portion may be, in particular, an overhang of the insulating housing, so that the printed circuit board may be arranged beneath the overhang and be connected to the solder connection contact surface. The overhang thus at least partially surrounds or encompasses the printed circuit board. A graduation of the insulating housing may be formed by the set-back portion, so that a housing wall of the insulating housing runs with an offset on a different level on one side of the set-back portion than on the other side of the set-back portion. The sections of the housing wall on the two sides of the set-back portion may run in-parallel to each other. For example, the offset may have a dimension which corresponds to half the thickness of a printed circuit board.

The insulating housing may have a second set-back portion on the side opposite the opening, the printed circuit board being able to be arranged on the second set-back portion.

A first set-back portion and a second set-back portion may be arranged on the conductor connecting module. This has the advantage that the same type of conductor connecting module may be arranged on opposite sides of a single printed circuit board without having to increase the number of variants.

On the side of the insulating housing on which the opening is arranged, the insulating housing may have at least one latching element for latching to the printed circuit board. The latching element may also advantageously be designed as a latching pin, the latching pin being insertable into a corresponding latching recess of the printed circuit board.

It has been shown that, in particular, a multiplicity of latching pins are suitable, in particular two latching pins, for the purpose of facilitating a defined positioning of the conductor connecting module on the printed circuit board, since the latching pins may be inserted only into the corresponding latching recesses provided therefor. The likelihood of an incorrect positioning or a twisting of the conductor connecting module with respect to the printed circuit board is thus reduced.

The latching element may be movably supported in the insulating housing.

A vertical displacement (in the main extension direction of the conductor connecting module) as well as a horizontal displacement (transversely to the main extension direction of the conductor connecting module) are conceivable.

A free space may be arranged on the insulating housing in the region of the solder connection contact surfaces of the contact element.

The free space has the advantage that, in particular, heat may be better supplied to the solder connection contact surface for the purpose of improving the soldering operation to the printed circuit board. In particular, the free space does not have the purpose of connected further conductors to the conductor connecting module and/or the printed circuit board. The free space is therefore, in particular, not large enough for an electrical conductor to be easily plugged into the free space, so that a faulty contacting is initiated.

The object is furthermore achieved by a set made up of a printed circuit board and a conductor connecting module described above.

The printed circuit board may be arranged in a housing, the conductor connecting module being insertable into a recess of the housing.

The conductor connecting modules may be better placed on the printed circuit board in this way, the printed circuit board and at least a portion of the conductor connecting modules being protected against external influences by the housing. It is conceivable that the housing is a housing of an electronic device, which may also be latched, for example, on a mounting rail.

At least one conductor connecting module may be arranged on sides of the printed circuit board opposite each other. In this way, the space for positioning multiple conductor connecting modules on the printed circuit board may be used efficiently.

A dome may be arranged on the housing, the dome being able to be plugged into a corresponding first recess in the printed circuit board and a corresponding second recess in the insulating housing of the conductor connecting module.

In particular, the dome may be press-fit stemmed into the corresponding recess after insertion. In this way, the printed circuit board and the conductor connecting module may no longer be indestructible separated from each other.

Further, it is also conceivable that a multiplicity of solder connection contact surfaces, for example two, three, or four thereof, are present on one contact element or multiple contact elements.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
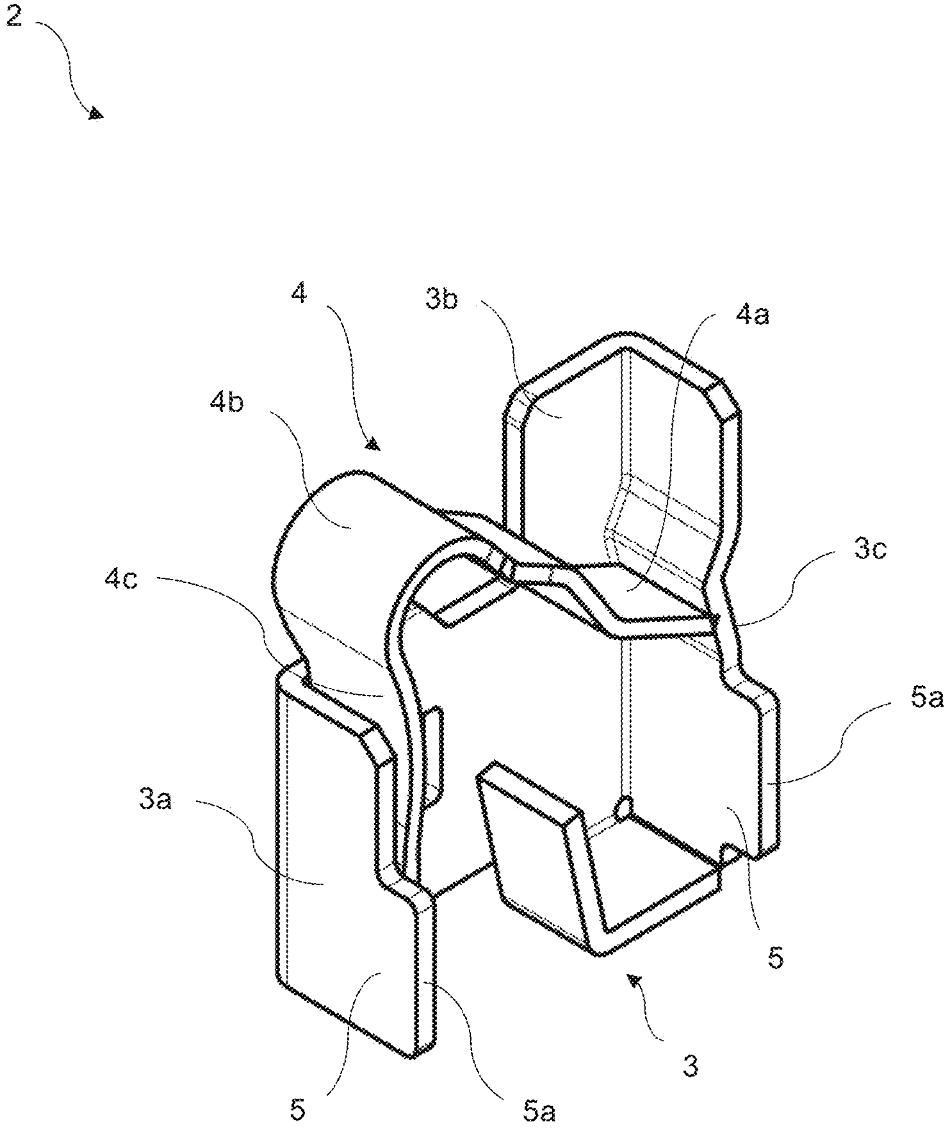
FIG. 1*a* shows a perspective view of a contact insert in an example for a conductor connecting module according to the invention.
Figure 1B:
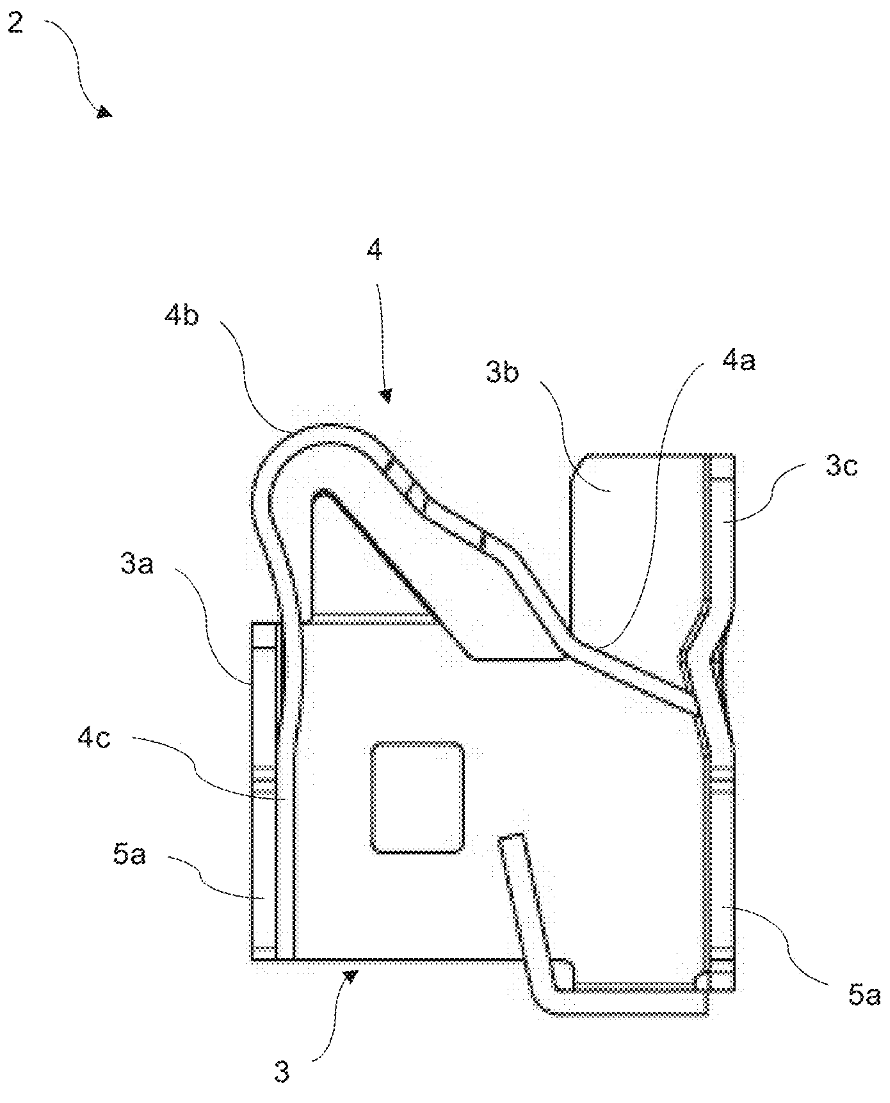
FIG. 1*b* shows a side view of contact insert according to FIG. 1*a;*

FIG. 1*a* shows a perspective view of a contact insert 2 in a first example for a conductor connecting module 1 according to the invention, FIG. 1*b* showing a side view of contact insert 2 according to FIG. 1*a*. The contact insert has a busbar 3 and a clamping spring 4. Busbar 3 is designed as a frame-shaped busbar 3. Frame-shaped busbar 3 is provided with an essentially U-shaped design. Busbar 3 has a holding section 3*a* and a contact section 3*c*, holding section 3*a* and contact section 3*c* being connected to each other via a connecting section 3*b*. Holding section 3*a* and contact section 3*c* are formed opposite each other.

Clamping spring 4 has a clamping leg 4*a*, clamping leg 4*a* transitioning into a spring bend 4*b*, and spring bend 4*b* transitioning into a contact leg 4*c*, and contact leg 4*c* being designed for contact with holding section 3*a* of busbar 3. Clamping spring 4 has an essentially V-shaped-shaped design. Contact section 3*c* and clamping leg 4*a* of clamping spring 4 form a clamping point for an electrical conductor to be clamped.

A contact element 5 is arranged in each case on holding section 3*a* as well as on contact section 3*b*. In this example, contact element 5 extends in the extension of particular holding section 3*a* and particular contact section 3*b*. The front sides of contact elements 5 are designed as solder connection contact surfaces 5*a*. Solder connection contact surfaces 5*a* have an essentially flat surface and may be soldered onto a corresponding printed circuit board, for example by means of an SMD soldering method.

Figure 2:
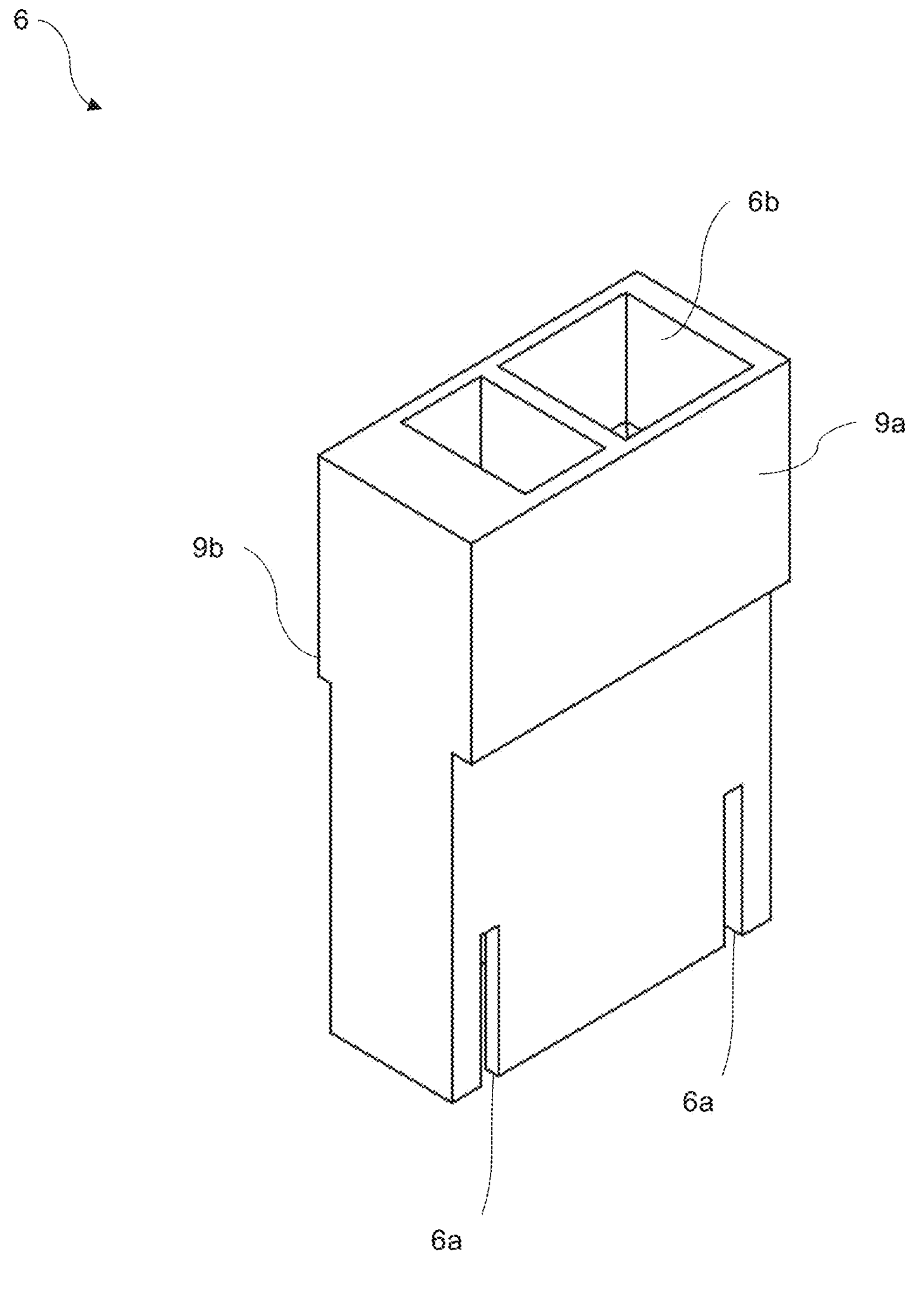
FIG. 2 shows a perspective view of an insulating housing for a conductor connecting module according to the invention.

FIG. 2 shows a perspective view of an insulating housing 6 for a conductor connecting module 1 according to the invention. Insulating housing 6 has an elongated and/or cuboid base body, into which a contact insert may be inserted, for example a contact insert according to FIGS. 1*a* and 1*b*. Insulating housing 6 has two openings 6*a*, where the solder connection contact surfaces 5*a* of contact element 5 are able to protrude through openings 6*a*.

Figure 3A:
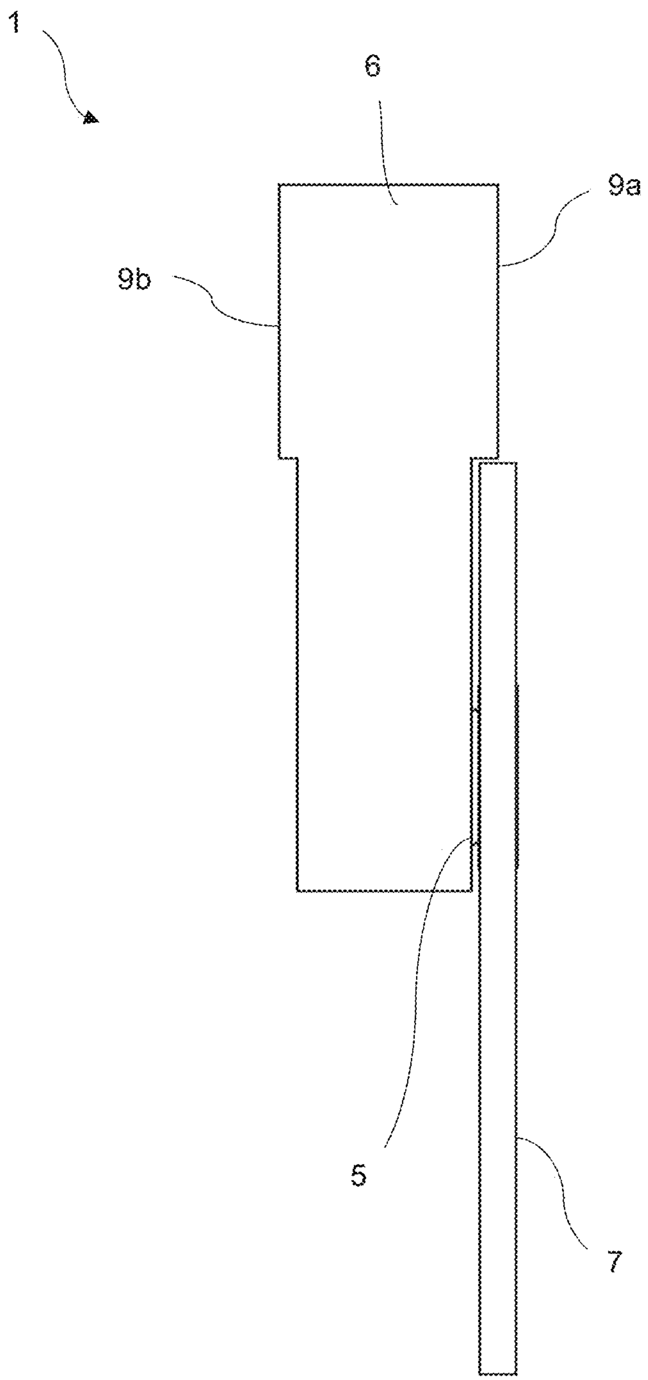
FIG. 3*a* shows a side view of a set made up of a printed circuit board and a conductor connecting module according to the invention in the example.
Figure 3B:
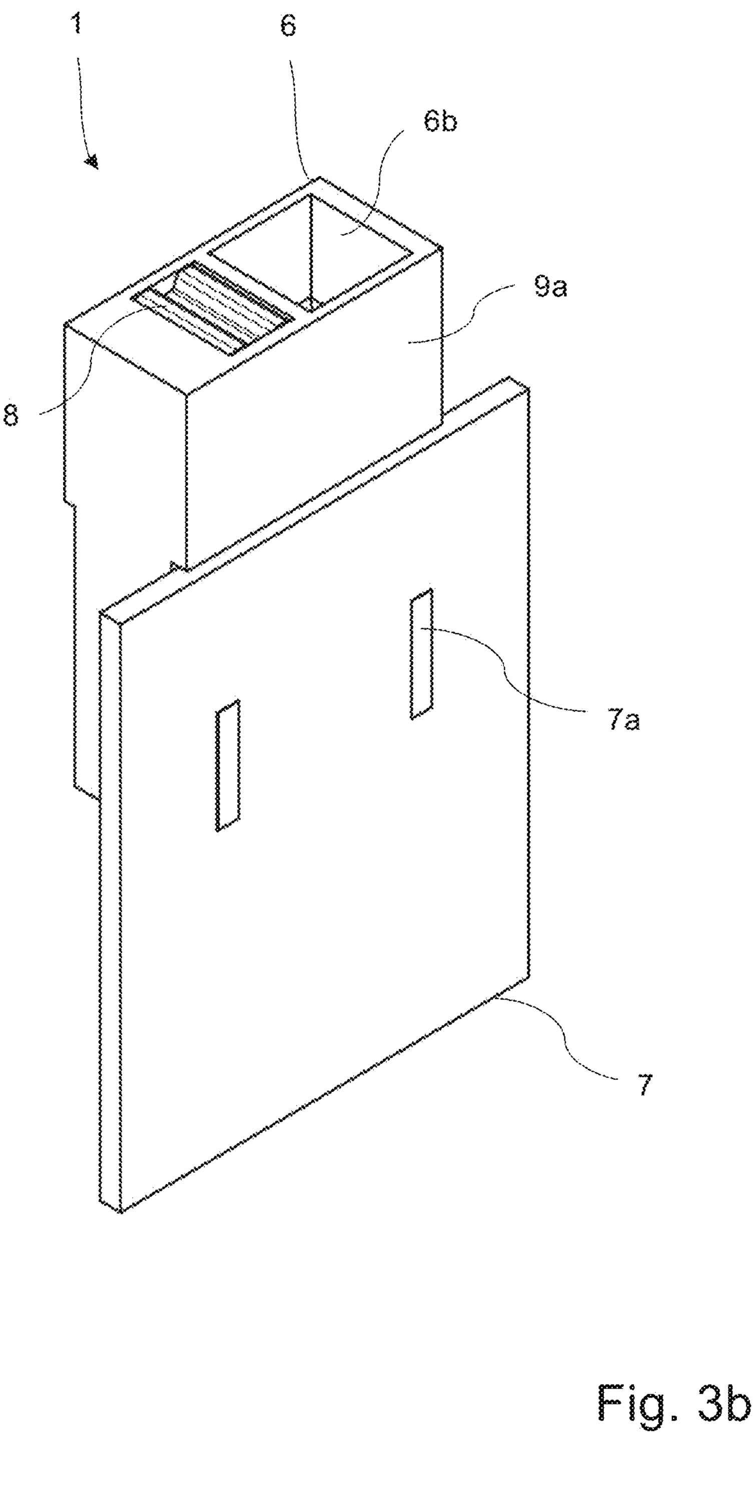
FIG. 3*b* shows a perspective view of a set according to FIG. 3*a;*

FIG. 3*a* shows a set made up of a printed circuit board 7 and a conductor connecting module 1 according to the invention in a first example, including a contact insert according to FIGS. 1*a* and 1*b* and an insulating housing 6 according to FIG. 2, while FIG. 3*b* shows a perspective view of the corresponding set according to FIG. 3*a*. It is clear that solder connection contact surfaces 5*a* of contact element 5 may be soldered on printed circuit board 7 through openings 6*a* of insulating housing 6.

In particular, the combined examination of FIGS. 1 through 3*b* clarifies the object of the present invention. It is clear that insulating housing 6 has an insertion opening 6*b* for inserting an electrical conductor. The clamping point formed by contact section 3*c* and clamping leg 4*a* may be opened and/or closed via an actuating element 8, which in this case is designed as an actuating pushbutton, other types of actuating elements 8 also being conceivable.

It is furthermore apparent that a first set-back portion 9*a* and a second set-back portion 9*b* are arranged on insulating housing 6. Set-back portion 9*a* is designed as a type of overhang of insulating housing 6, set-back portion 9*a* overlapping printed circuit board 7 in the mounted state. Printed circuit board 7 is thus arranged beneath set-back portion 9*a* and permits an improved seating of conductor connecting module 1.

It is clear from FIG. 3*a* that corresponding solder connection contact surfaces 7*a* of printed circuit board 7 are present on printed circuit board 7, solder connection contact surfaces 7*a* of printed circuit board 7 being able to be soldered to solder connection contact surfaces 5*a* of a further conductor connecting module 1.

Figure 4A:
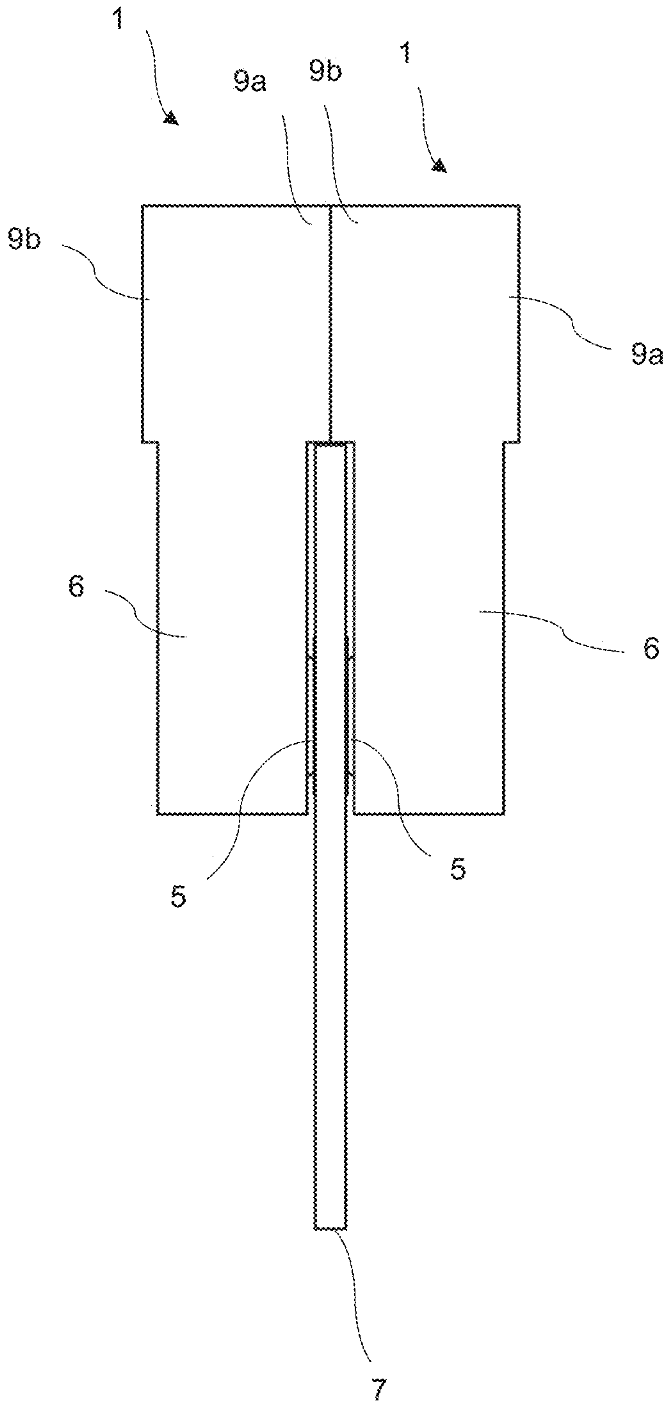
FIG. 4*a* shows a side view of a set made up of a printed circuit board and two conductor connecting modules according to the invention in an example.
Figure 4B:
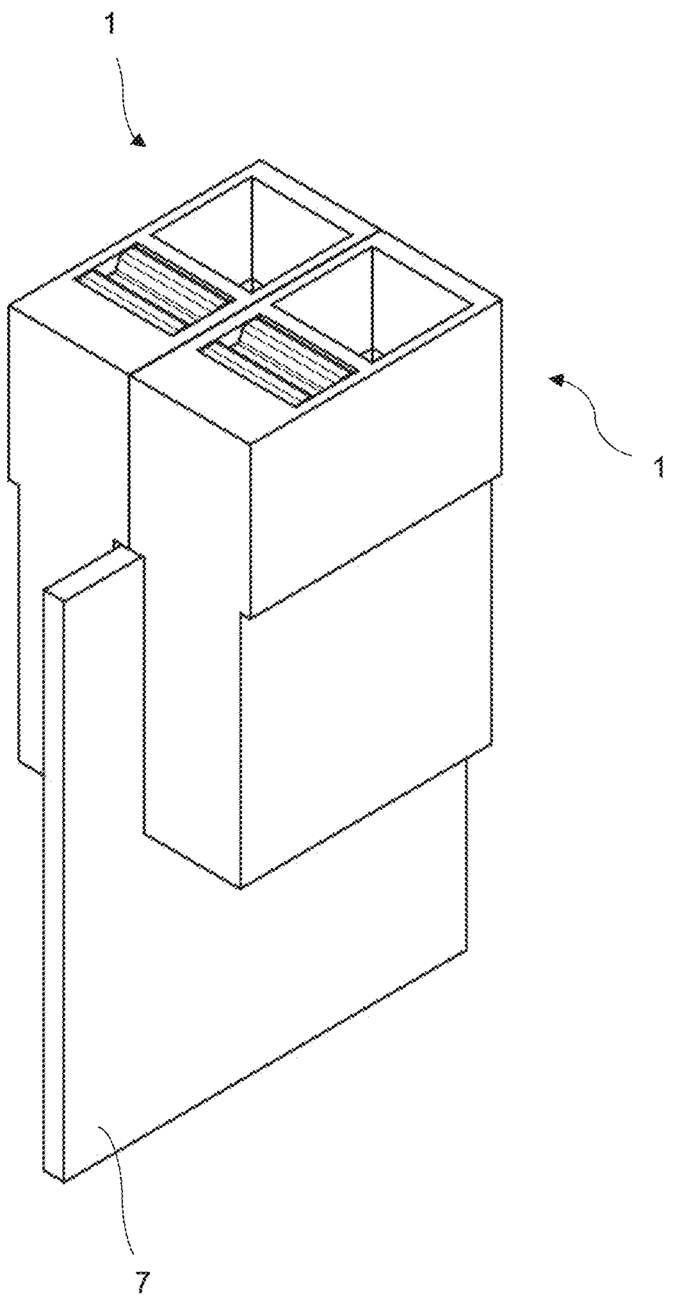
FIG. 4*b* shows a perspective view of a set according to FIG. 4*a;*

FIG. 4*a* shows a side view of a set made up of a printed circuit board 7 and two conductor connecting modules 1 according to the invention in a first example, FIG. 4*b* showing a perspective view of the set according to FIG. 4*a*.

The set according to FIGS. 4*a* and 4*b* differ from the set according to FIGS. 3*a* and 3*b* in that two conductor connecting modules 1 are present instead of a single conductor connecting module 1. It is clear that, due to the symmetrical structure of insulating housing 6, a conductor connecting module 1 is arranged in each case on both sides of printed circuit board 7 situated opposite each other and may be soldered to printed circuit board 7 via solder connection contact surfaces 5*a*. Due to first set-back portion 9*a* and second set-back portion 9*b*, insulating housing 6 may be positioned in each case on one side of printed circuit board 7 without having to structurally change the insulating housing.

Figure 5:
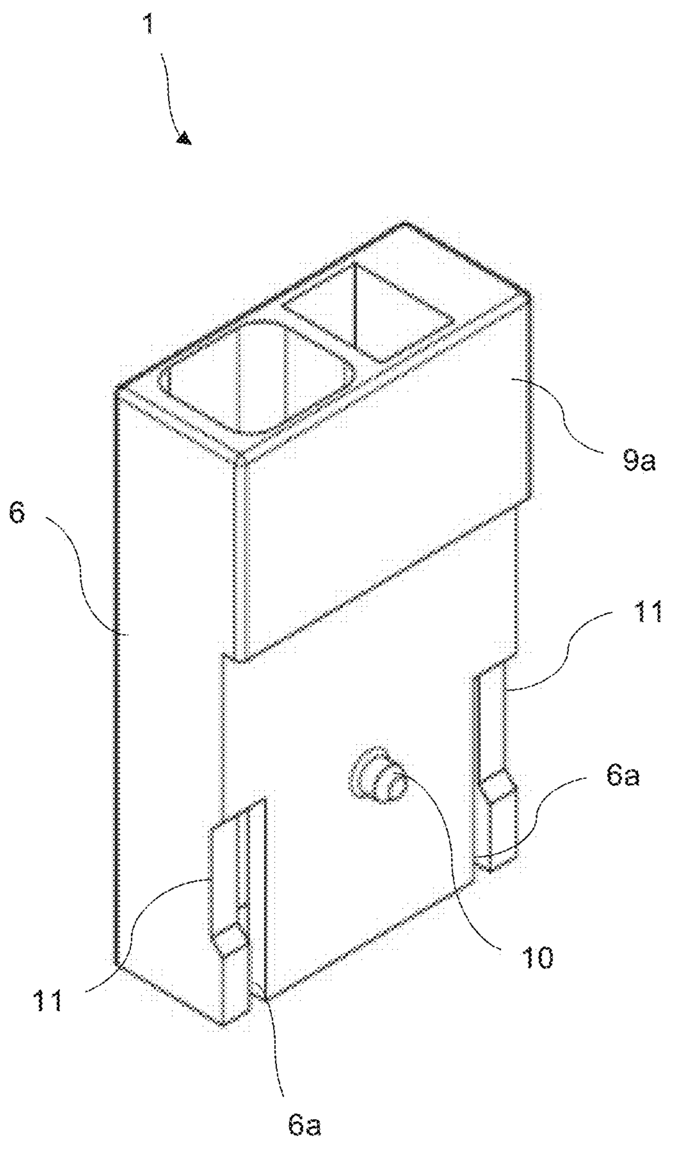
FIG. 5 shows a perspective view of a conductor connecting module in an example.

FIG. 5 shows a perspective view of a conductor connecting module 1 in a second example. Conductor connecting module 1 according to FIG. 5 differs from the example according to FIGS. 3*a* through 4*b* in that a first set-back portion 9*a*, but no second setback portion, is arranged on insulating housing 6.

It is clear that a latching element 10 is arranged on the side of the insulating housing on which openings 6*a* are arranged, the latching element being designed for latching to printed circuit board 7. Latching element 10 may be designed as a positioning element, which permits a better positioning on a printed circuit board.

It is furthermore clear that free spaces 11 are arranged on insulating housing 6 in the region of openings 6*a*. This has the advantage that heat may be better supplied to solder connection contact surface 5*a* for the purpose of improving the soldering operation to printed circuit board 7.

Figure 6A:
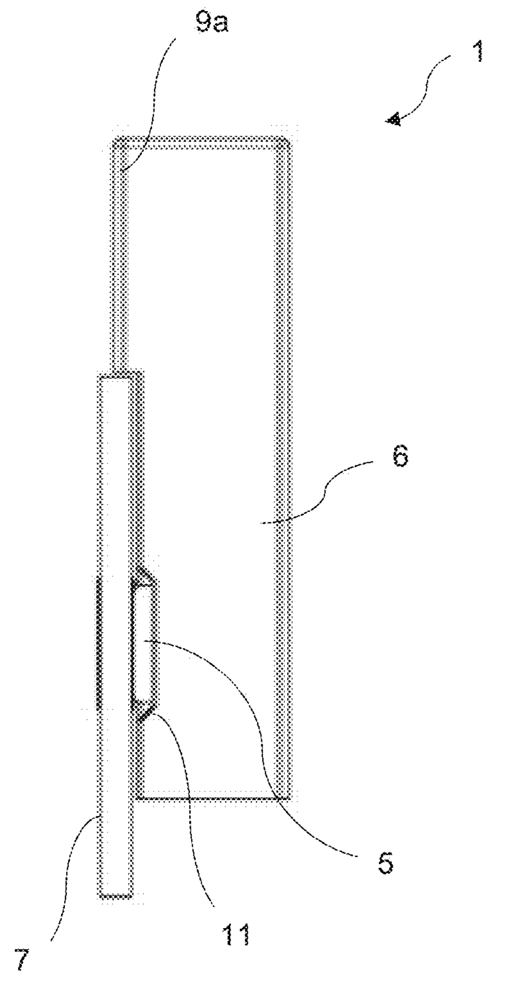
FIG. 6*a* shows a side view of a set made up of a printed circuit board and a conductor connecting module in an example according to FIG. 5.
Figure 6B:
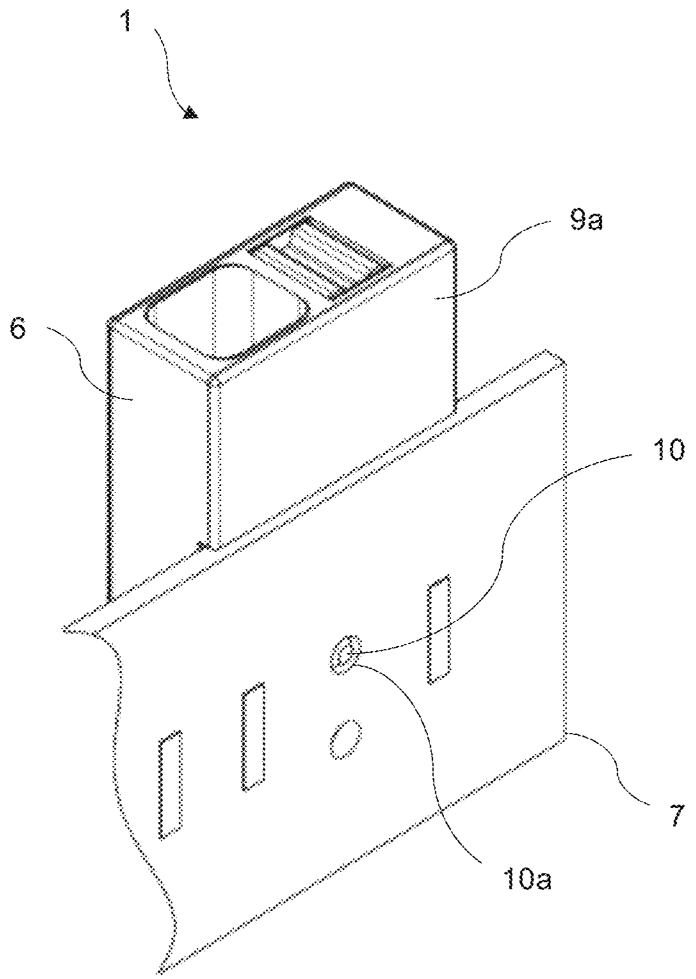
FIG. 6*b* shows a perspective view of a set according to FIG. 6*a;*

FIG. 6*a* shows a side view of a set made up of a printed circuit board 7 and a conductor connecting module 1 in a second example according to FIG. 5, FIG. 6*b* showing a perspective view of the set according to FIG. 6*a*.

It is clear that latching element 10 is designed as a latching pin, latching element 10 engaging with a corresponding latching recess 10*a* in printed circuit board 7. Latching element 10 makes it possible to ensure a correct positioning of conductor connecting module 1 on printed circuit board 7, and the likelihood of an incorrect positioning may be reduced.

It is also clear that, due to free space 11 on insulating housing 6 in the region of solder connection contact surfaces 5*a* of contact element 5 protruding from insulating housing 6, solder connection contact surfaces 5*a* may be better soldered from the outside, since the heat may be more easily supplied. Free space 11 is designed to be not large enough for a further electrical conductor to be plugged into free space 11. The likelihood of a faulty contacting via free space 11 is to be avoided or reduced by the correspondingly small design of free space 11.

Figure 7A:
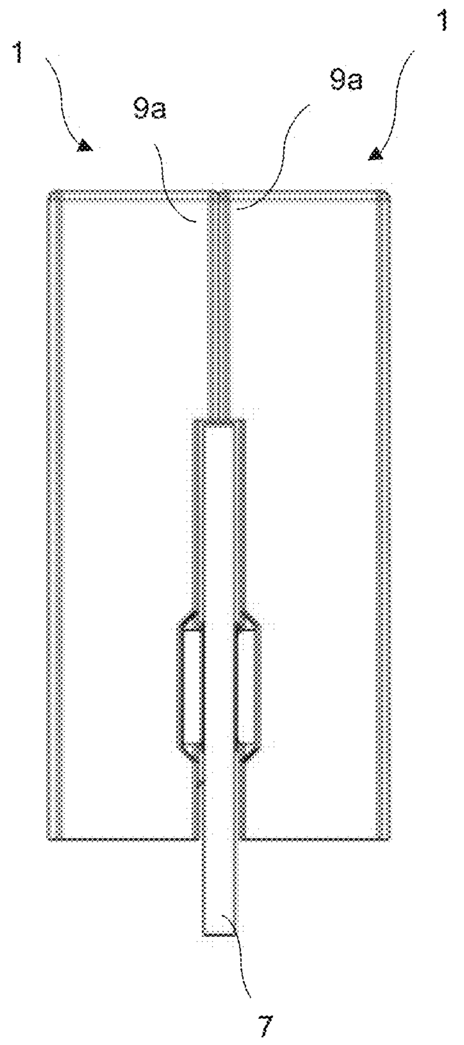
FIG. 7*a* shows a side view of a set made up of a printed circuit board and two conductor connecting modules in an example.
Figure 7B:
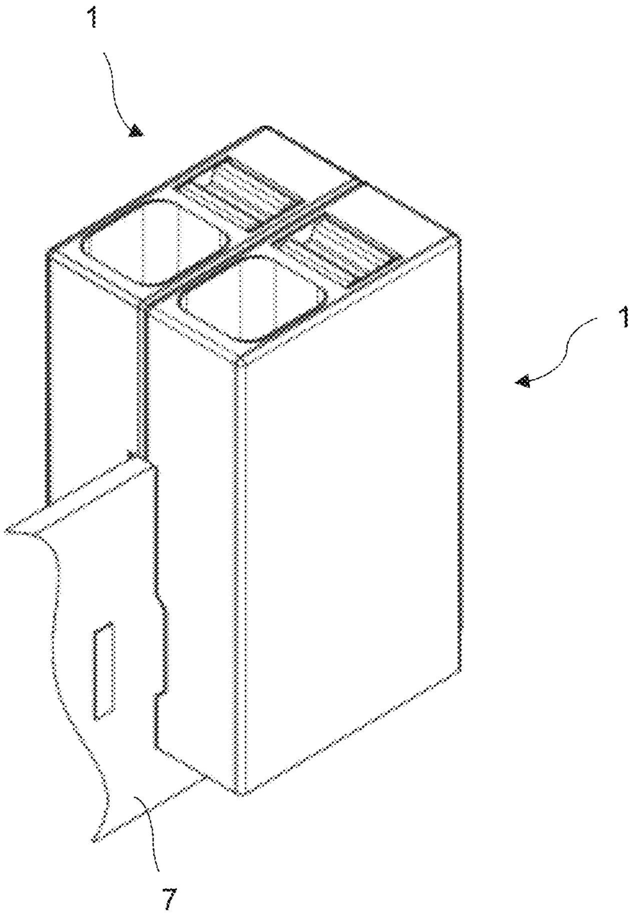
FIG. 7*b* shows a perspective view of a set according to FIG. 7*a;*

FIG. 7*a* shows a side view of a set made up of a printed circuit board 7 and two conductor connecting modules 1 according to the invention in a second example, FIG. 7*b* showing a perspective view of the set according to FIG. 7*a*.

The set according to FIGS. 7*a* and 7*b* differs from the set according to FIGS. 6*a* and 6*b* in that two conductor connecting modules 1 are present instead of a single conductor connecting module 1.

It is clear that a conductor connecting module 1 is arranged in each case on both sides of printed circuit board 7 and may be soldered to printed circuit board 7 via solder connection contact surfaces 5*a*. Insulating housing 6 may be positioned in each case on one side of printed circuit board 7 via particular first set-back portion 9*a*. In contrast to a conductor connecting module 1 having a second set-back portion, further installation space may be saved in this way. In contrast to conductor conducting modules 1 according to FIGS. 4*a* and 4*b*, conductor connecting modules 1 are provided with a mirror-inverted structure, so that a symmetry of the conductor connecting modules is still present after mounting on printed circuit board 7.

Figure 8:
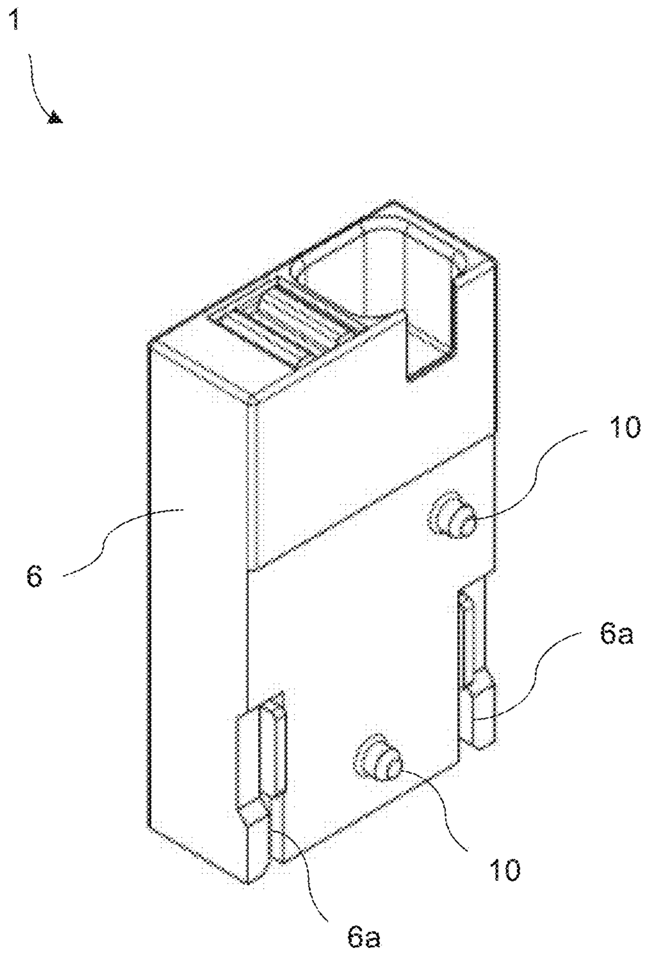
FIG. 8 shows a perspective view of a conductor connecting module in an example.

FIG. 8 shows a perspective view of a conductor connecting module 1 in a third example. In contrast to the second example according to FIG. 5, it is clear that two latching elements 10 are arranged on conductor connecting module 1, which are designed as latching pins. The different positioning of latching element 10 on the side of insulating housing 6 on which openings 6*a* are arranged ensures an exact positioning of conductor connecting module 1 on a printed circuit board 7 provided for this purpose, which has corresponding latching recesses 10*a*. A faulty positioning is reduced or avoided by the location of latching elements 10.

Figure 9:
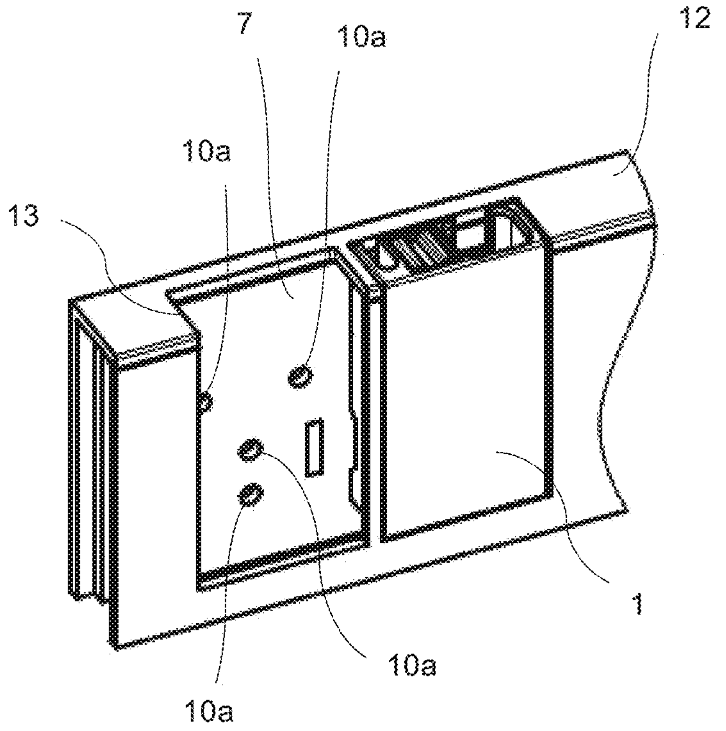
FIG. 9 shows a perspective view of a set made up of a printed circuit board arranged in a housing and a conductor connecting module according to FIG. 8.

FIG. 9 shows a perspective view of a set made up of a printed circuit board 7 arranged in a housing 12 and a conductor connecting module 1 according to FIG. 8. It is apparent that printed circuit board 7 is arranged in a housing 12, conductor connecting modules 1 being able to be inserted into a corresponding recess 13 of housing 12. In this way, conductor connecting modules 1 may be better placed on printed circuit board 7, printed circuit board 7 and at least a portion of conductor connecting modules 1 being protected against external influences by housing 12. It is conceivable that housing 12 is a housing 12 of an electronic device, which may also be latched, for example, on a mounting rail.

It is furthermore clear that corresponding latching recesses 10*a* are provided on printed circuit board 7, so that corresponding conductor connecting modules 1 may be positioned in the correct position on printed circuit board 7. In this example, corresponding conductor connecting modules 1 may be positioned on only one side of printed circuit board 7. However, it is conceivable that conductor connecting modules 1 may be positioned on both sides of printed circuit board 7. Housing 12 then has corresponding recesses 13 on both sides of printed circuit board 7.

Figure 10:
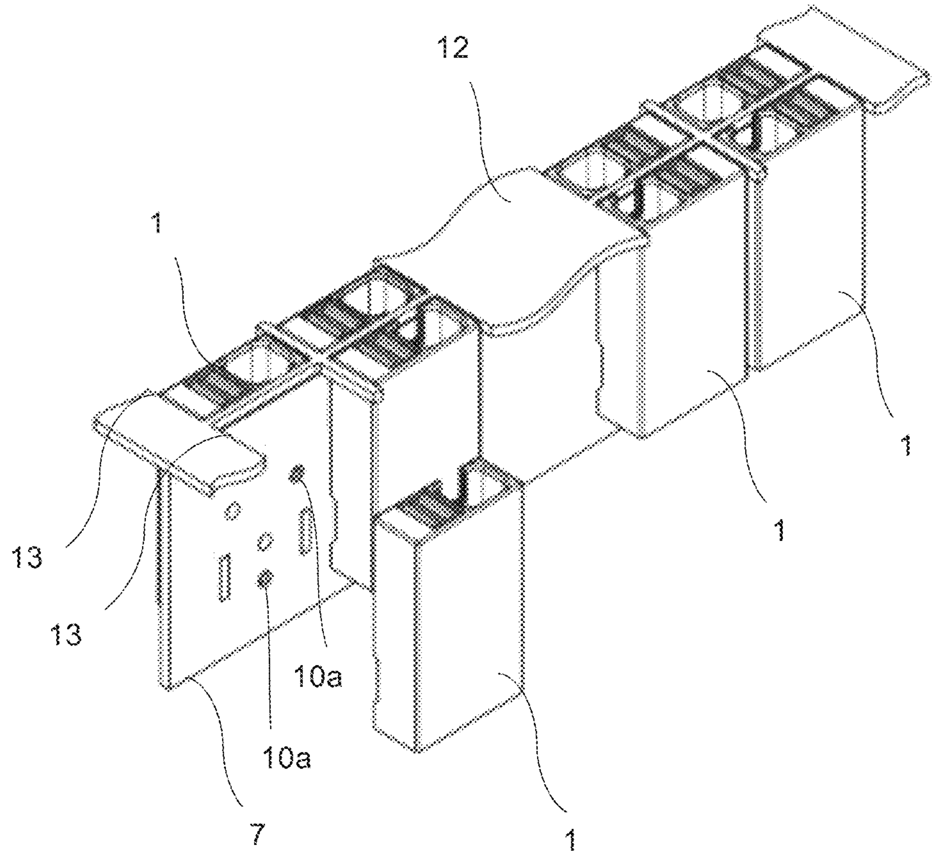
FIG. 10 shows a perspective view of a set made up of a printed circuit board arranged in a housing and a plurality of conductor connecting modules according to FIG. 8.

FIG. 10 shows a perspective view of a set made up of a printed circuit board 7 arranged in a housing 12 and a plurality of conductor connecting modules 1 according to FIG. 8. In contrast to FIG. 9, corresponding conductor connecting modules 1 may be soldered on opposite sides of printed circuit board 7. Latching pins 10 of conductor connecting module 1 engages with latching recesses 10*a* provided therefor to ensure the correct positioning of conductor connecting module 1. Recesses 13 situated opposite each other are furthermore provided on housing 12 for the purpose of positioning corresponding conductor connecting modules 1 on printed circuit board 7.

Figure 11:
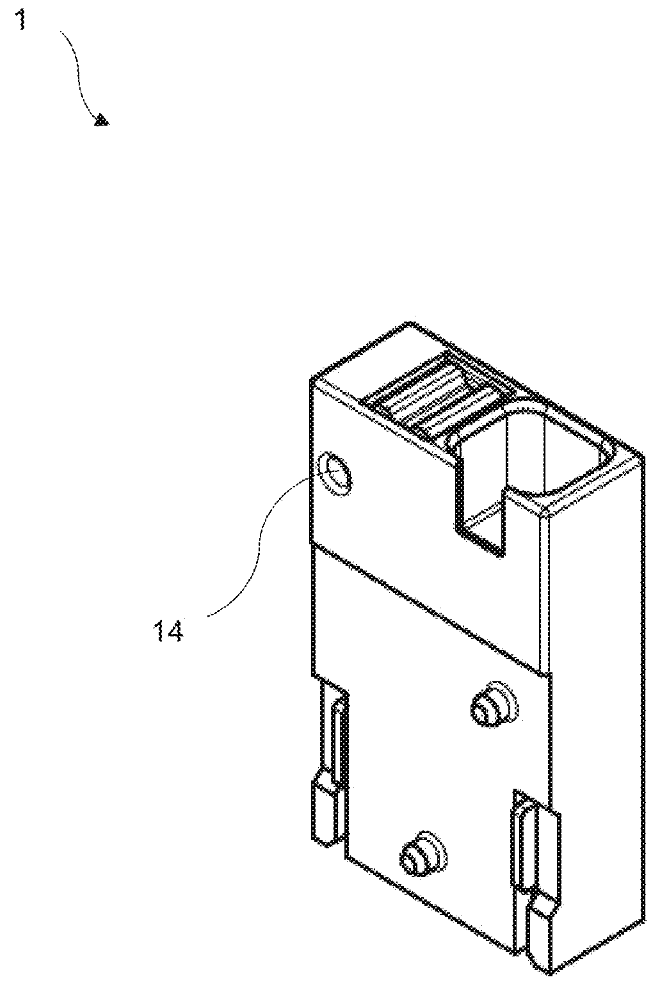
FIG. 11 shows a perspective view of a conductor connecting module in an example.

FIG. 11 shows a perspective view of a conductor connecting module 1 in a fourth example. In contrast to conductor connecting module 1 in the third example according to FIG. 8, conductor connecting module 1 has an additional corresponding recess 14. A dome, which is arranged, for example, on a housing 12 or directly on a printed circuit board 7, may engage with corresponding recess 14. This connection may further fix conductor connecting module 1 in position on printed circuit board 7. In addition, the dome may be press-fit stemmed after mounting, so that a non-destructive separation of the components is no longer possible.

It is conceivable that an additional metal part may be inserted into recess 14, in particular, for example, a metal pin, which is soldered to the printed circuit board and may be used for additional fastening of the terminal on the printed circuit board.

Figure 12A:
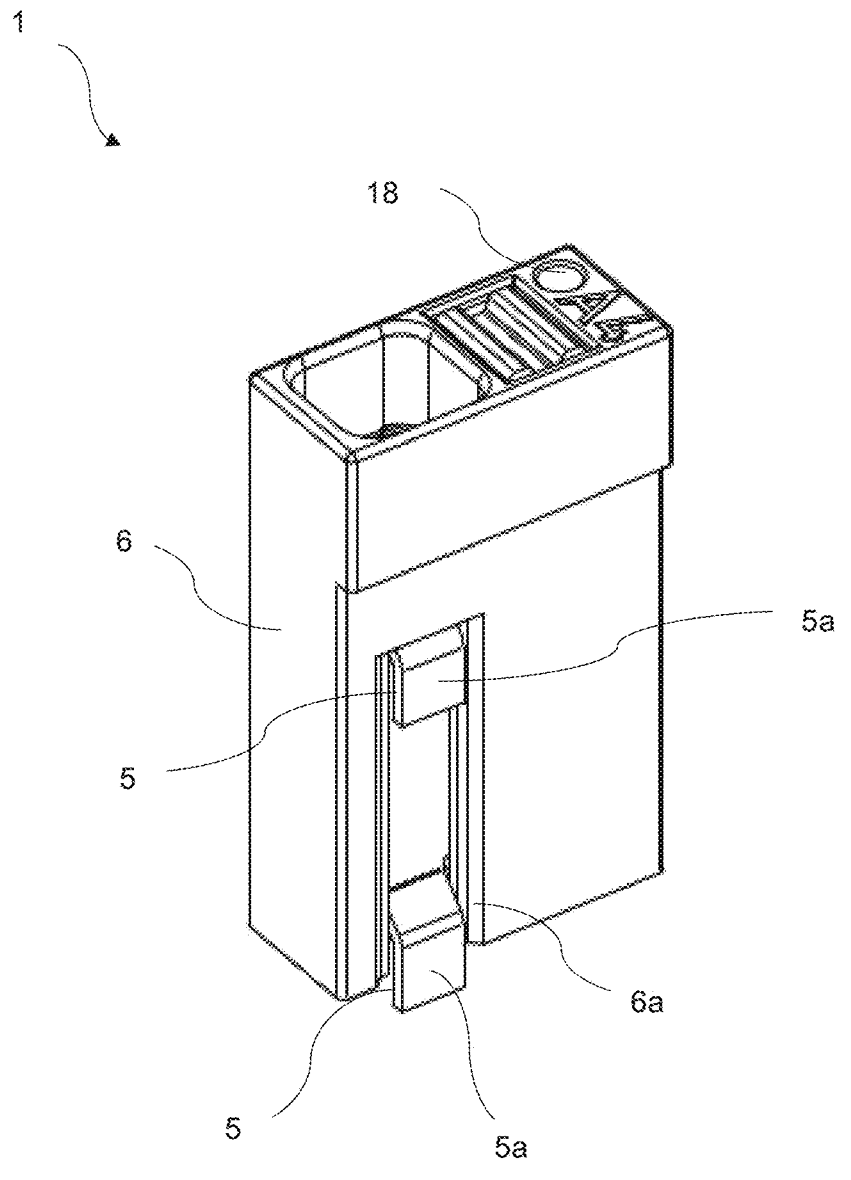
FIG. 12*a* shows a perspective view of a conductor connecting module in an example.

FIG. 12*a* shows a perspective view of a conductor connecting module 1 in a fifth example. In contrast to the first through fourth examples, conductor connecting module 1 has only one larger opening 6*a* in insulating housing 6, through which two solder connection contact surfaces 5*a* of contact elements 5 protrude. It is clear that solder connection contact surfaces 5*a* are also not designed as front sides of contact elements 5, but are provided by bending contact elements 5. In this way, a larger surface of solder connection contact surfaces 5*a* may be provided to enlarge the soldering surface on a printed circuit board 7. A test opening 18 is furthermore arranged on conductor connecting module 1 in the illustrated example.

Figure 12B:
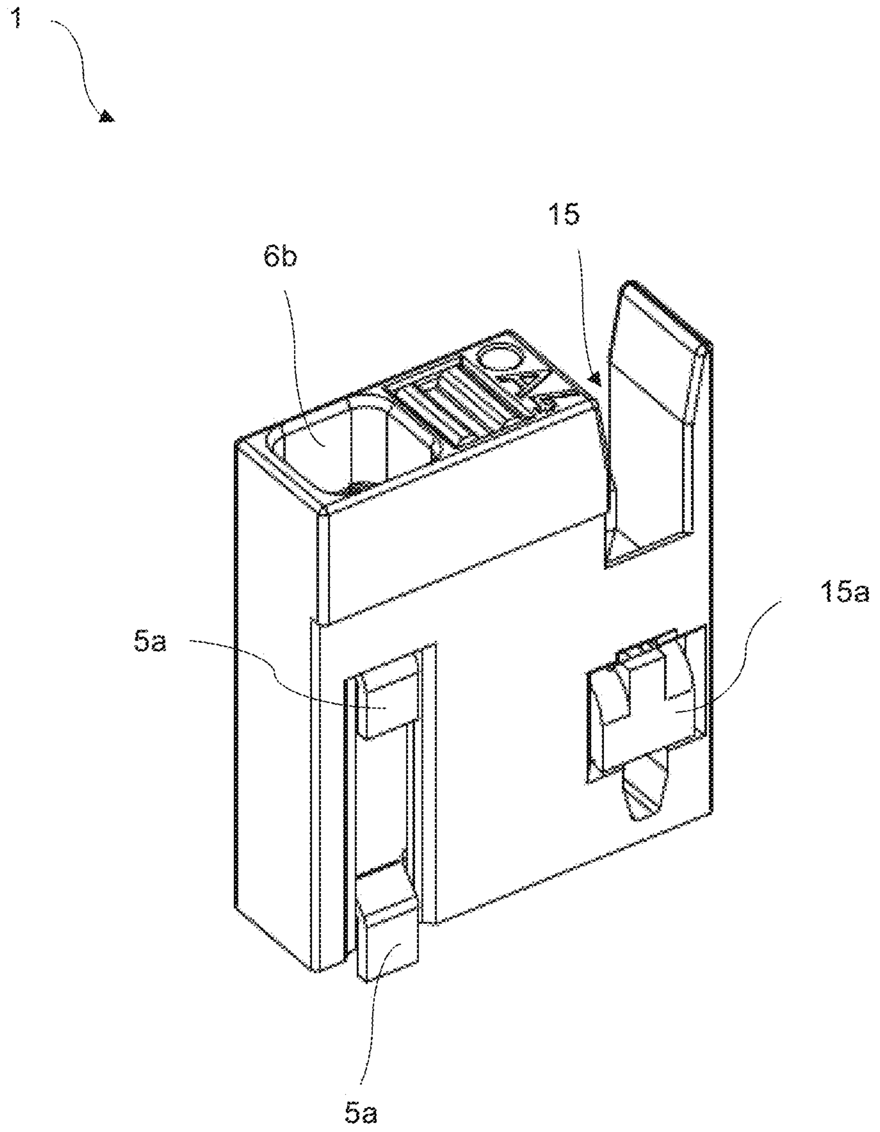
FIG. 12*b* shows a perspective view of a conductor connecting module in an example.

FIG. 12*b* shows a perspective view of a conductor connecting module 1 in a sixth example. In contrast to conductor connecting module 1 according to FIG. 12*a*, a plug-in location 15 is also added to this conductor connecting module 1. This plug-in location 15 may be designed, for example, to be wider than insertion opening 6*b* for the electrical conductor. An assigned plug-in location contact 15*a*, which may be soldered on a corresponding printed circuit board, may be assigned to plug-in location 15.

Figure 13:
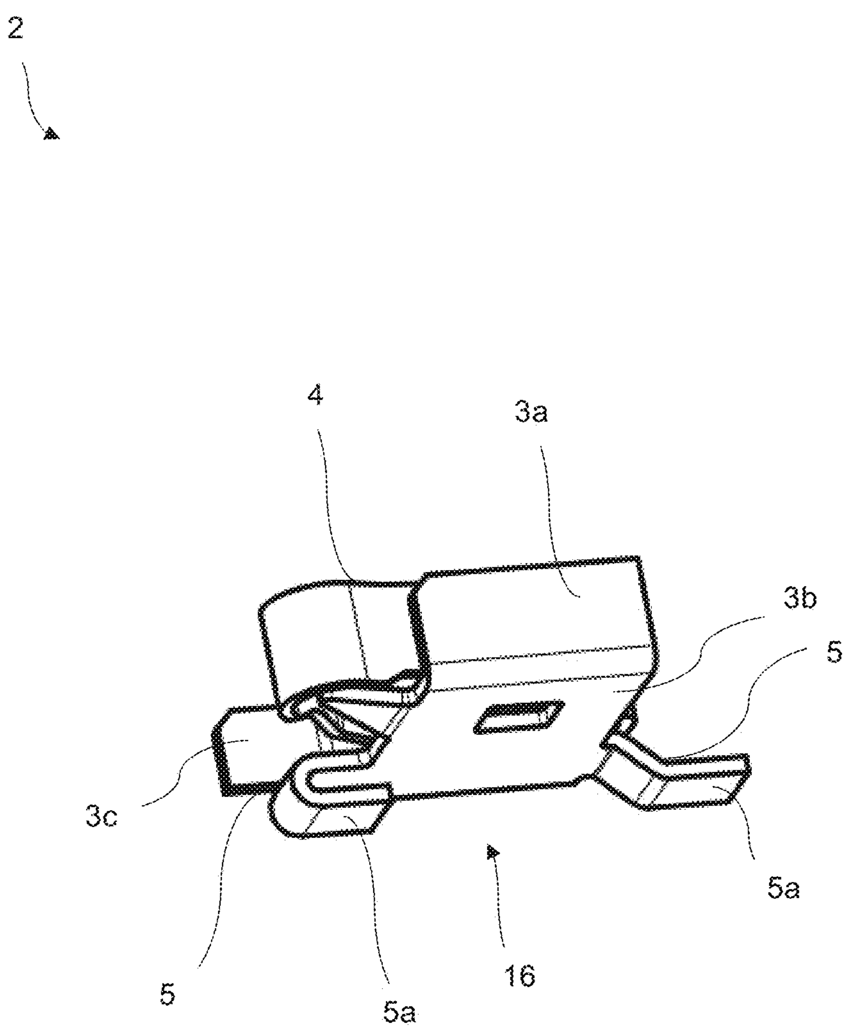
FIG. 13 shows a perspective view of a contact insert for a conductor connecting module according to FIGS. 12*a* and 12*b;*

FIG. 13 shows a perspective view of a contact insert 2 for a conductor connecting module 1 according to FIGS. 12*a* and 12*b* in a second example. It is clear that two contact elements 5 protrude from connecting section 3*b* of busbar 3. Solder connection contact surfaces 5*a* of contact elements 5 are provided in that contact elements 5 are each bent on their free ends and thereby provide a surface for soldering onto a printed circuit board 7.

It is clear that solder connection contact surfaces 5*a* are essentially arranged on a shared imaginary straight line and/or plane. In addition, solder connection contact surfaces 5*a* are arranged on the side of busbar 3 facing away from the clamping point, i.e., on back side 16 if connecting section 3*b*.

Figure 14:
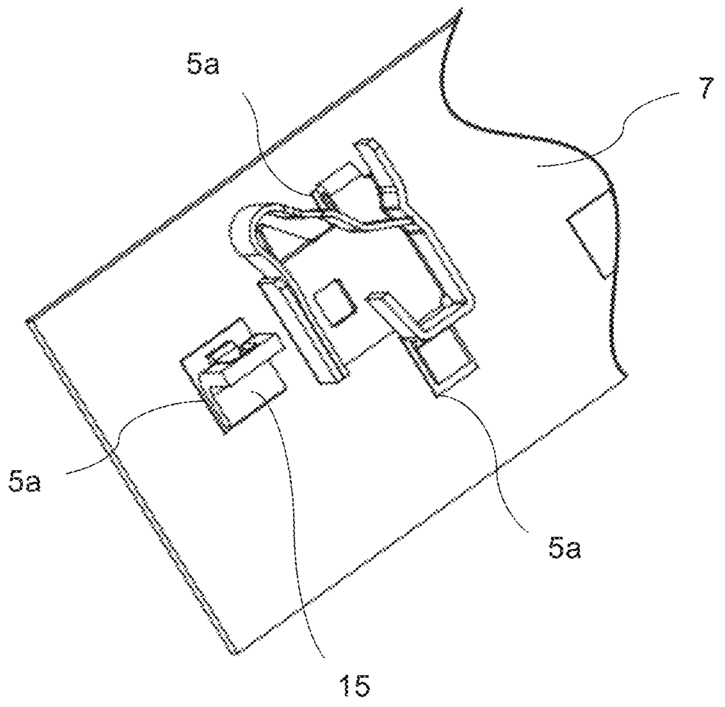
FIG. 14 shows a perspective view of a printed circuit board, including a contact insert according to FIG. 13.

FIG. 14 shows a perspective view of a printed circuit board 7, including a contact insert 2 according to FIG. 13. FIG. 14 is intended to clarify, in particular, the mounting of a conductor connecting module 1 according to the invention on printed circuit board 7, insulating housing 6 not being shown for improved clarity. It is apparent that the conductor connecting module is soldered on printed circuit board 7 on solder connection contact surfaces 5*a* of contact elements 5 of contact insert 2. In addition, solder connection contact surfaces 5*a* of plug-in location 15 were soldered onto printed circuit board 7, for example for a bridging plug.

Figure 15:
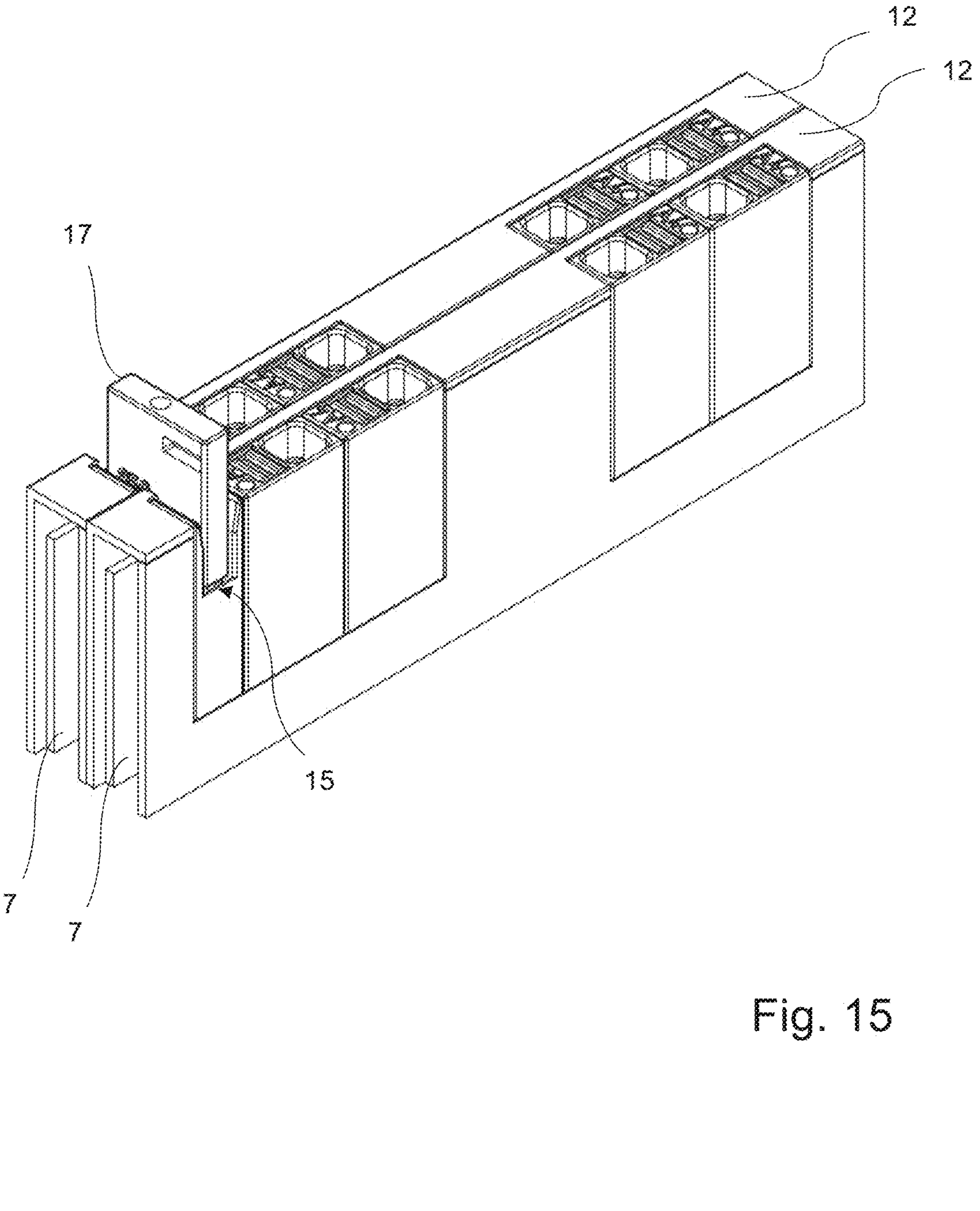
FIG. 15 shows a perspective view of a set made up of a printed circuit board according to FIG. 14 arranged in a housing and a conductor connecting module according to FIGS. 12*a* and 12*b;*

FIG. 15 shows a perspective view of a set made up of a printed circuit board 7 arranged in a housing 12 according to FIG. 14 and a conductor connecting module according to FIGS. 12*a* and 12*b*, in this example two housings 12, each having one printed circuit board 7, being arranged one after the other or side by side.

In housings 12, conductor connecting modules according to FIGS. 12*a* and 12*b* were inserted in each case into recesses 13 provided therefor. It is clear that a bridging plug 17 is arranged in plug-in locations 15 provided therefor. Due to bridging plug 17, an electrically conductive connection between printed circuit boards 7 may be achieved, which are accommodated in particular housings 12 situated side by side or one after the other.

Figure 16A:
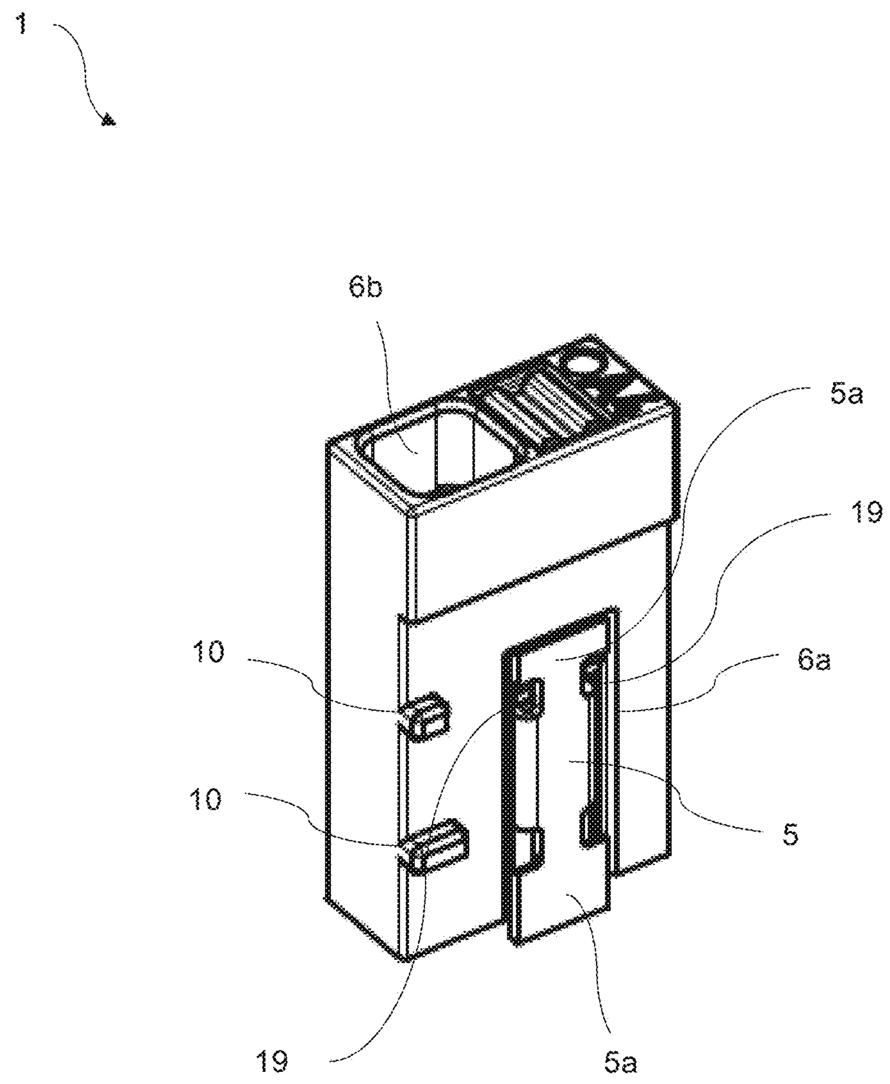
FIG. 16*a* shows a perspective view of a conductor connecting module in an example.

FIG. 16*a* shows a perspective view of a conductor connecting module 1 in a seventh example. It is apparent that two latching elements 10 are arranged on conductor connecting module 1, which may be inserted into a corresponding latching recess 10*a* of a printed circuit board 7. Latching elements 10 may be dimensioned to be different in size. In this way, a faulty positioning of conductor connecting module 1 on printed circuit board 7 may be further reduced.

Latching tabs 19 are also arranged in the housing, contact insert 2 being latchable to latching tabs 19 to ensure a secure seating of the contact insert.

In contrast to the first through fourth examples, conductor connecting module 1 has only one larger opening 6*a* in insulating housing 6, through which two solder connection contact surfaces 5*a* of contact elements 5 protrude. It is clear that solder connection contact surfaces 5*a* are also not designed as front sides of contact elements 5. The exact design of contact element 5 is explained in greater detail below under FIG. 17.

Figure 16B:
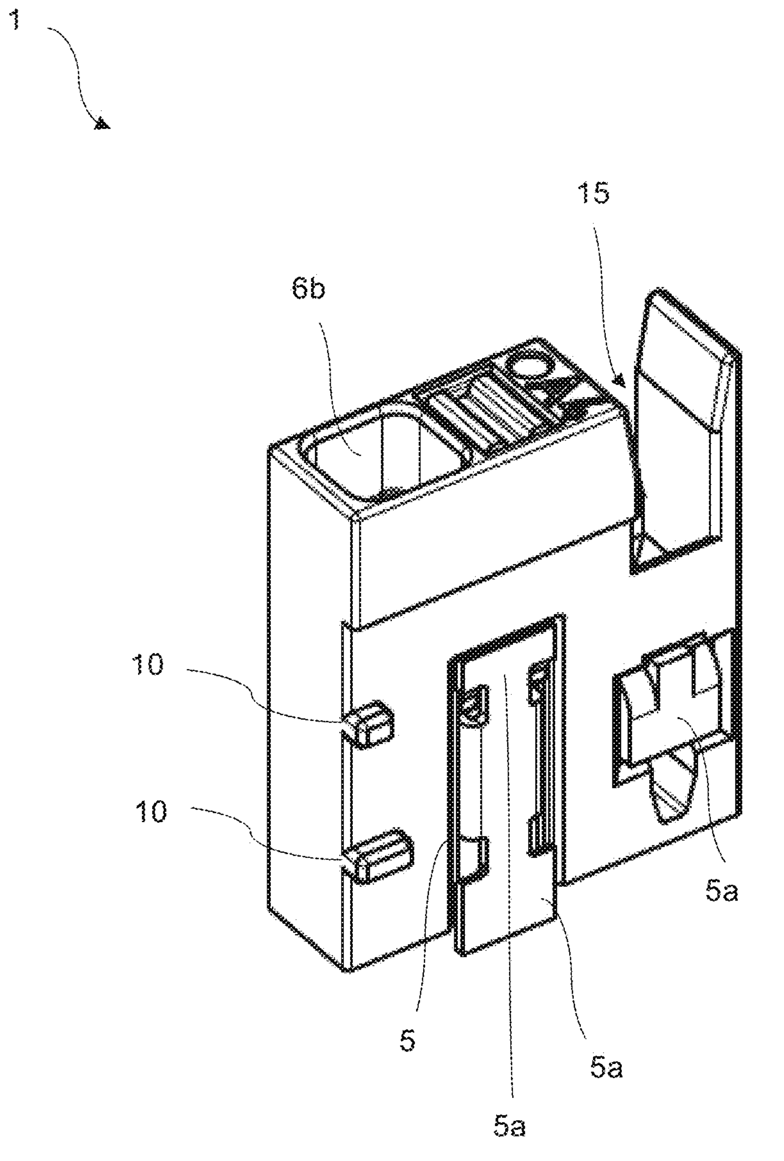
FIG. 16*b* shows a perspective view of a conductor connecting module in an example.

FIG. 16*b* shows a perspective view of a conductor connecting module 1 in an eighth example. In contrast to conductor connecting module 1 according to FIG. 16*a*, a plug-in location 15 is also added to this conductor connecting module 1. This plug-in location 15 may be designed, for example, to be wider than insertion opening 6*b* for the electrical conductor. A bridging plug, for example, may then be inserted into a plug-in location 15 of this type for the electrically conductive connection of second conductor connecting modules 1. Plug-in location 15 may be electrically conductively soldered on a printed circuit board 7 via a corresponding solder connection contact surface 5*a*.

Figure 17:
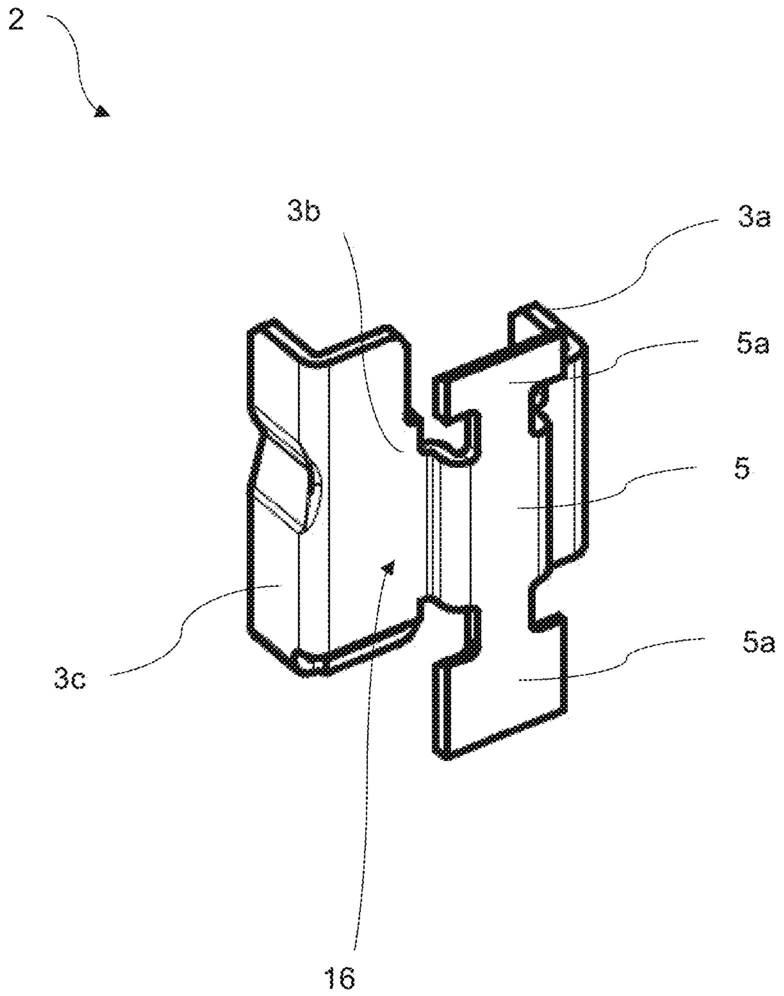
FIG. 17 shows a perspective view of a contact insert for a conductor connecting module according to FIGS. 16*a* and 16*b;*

FIG. 17 shows a perspective view of a contact insert 2 for a conductor connecting module 1 according to FIGS. 16*a* and 16*b* in a third example. It is clear that contact element 5 is brought out from connecting section 3*b* of busbar 3. Connecting section 3*b* thus simultaneously forms contact element 5. Solder connection contact surfaces 5*a* are arranged on the side of busbar 3 facing away from the clamping point, i.e., on back side 16 of connecting section 3*b*.

Figure 18:
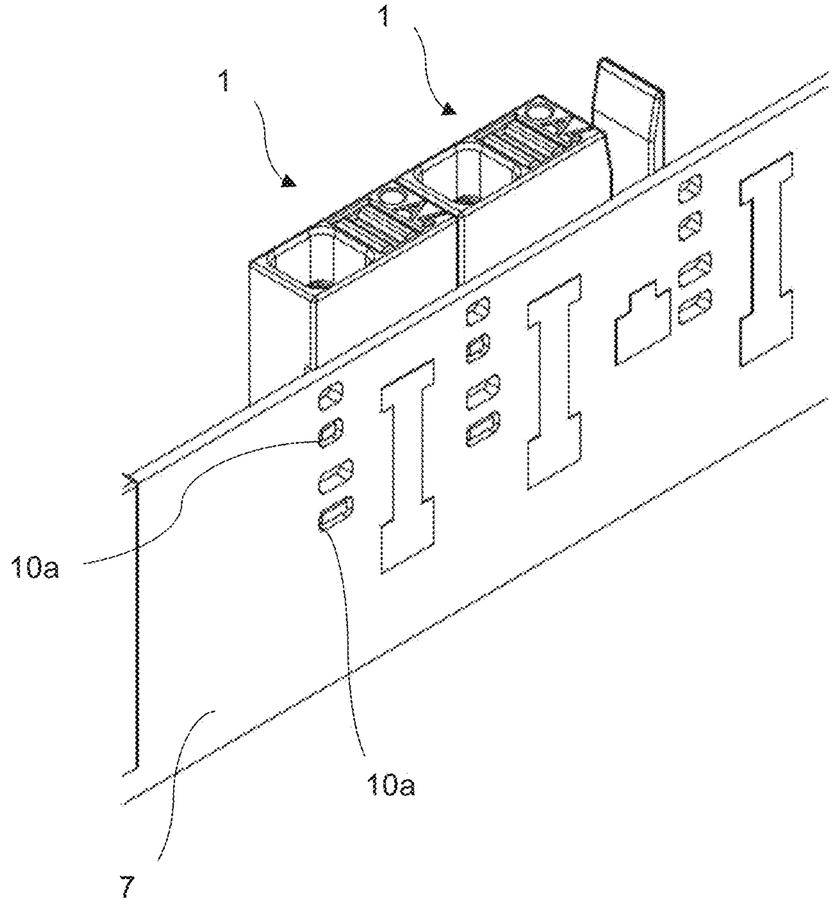
FIG. 18 shows a perspective view of a set made up of a printed circuit board and conductor connecting modules according to FIGS. 16*a* and 16*b;*

FIG. 18 shows a perspective view of a set made up of a printed circuit board 7 and conductor connecting modules 1 according to FIGS. 16*a* and 16*b*. It is clear that conductor connecting modules 1 are inserted into corresponding latching recesses 10*a* via latching elements 10 to ensure the correct positioning of conductor connecting modules 1.

Figure 19:
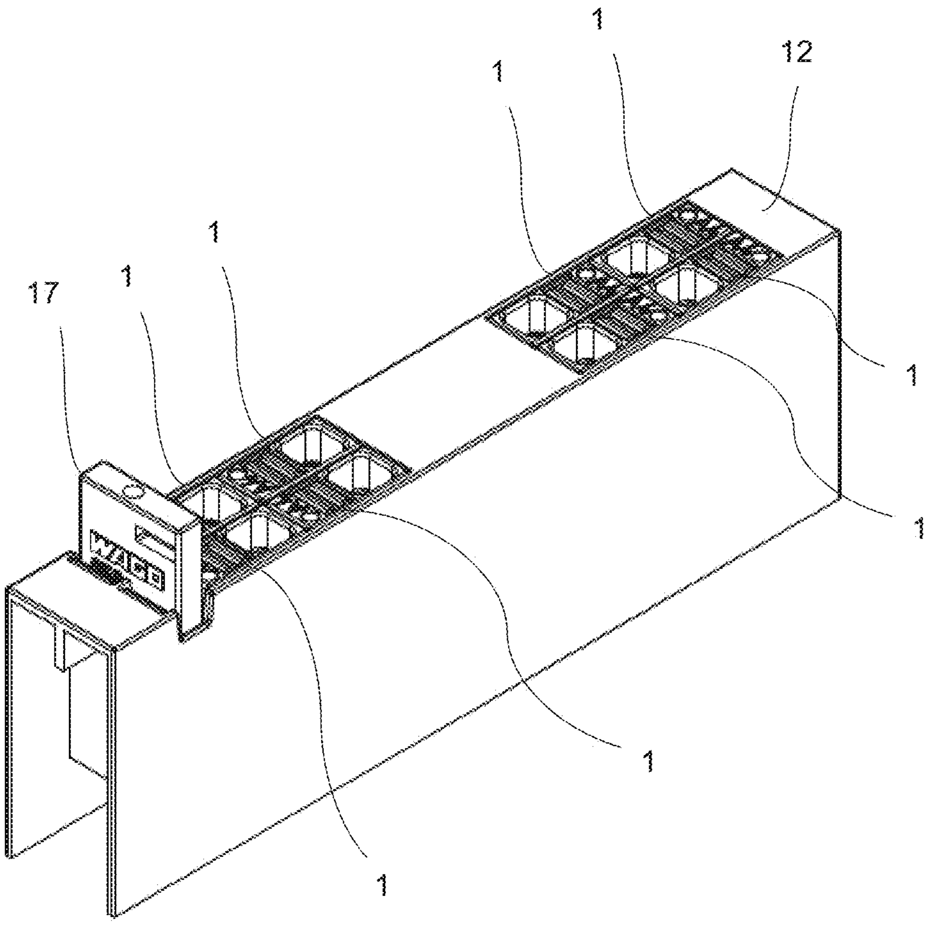
FIG. 19 shows a perspective view of a set made up of a printed circuit board according to FIG. 18 arranged in a housing and conductor connecting modules according to FIGS. 16*a* and 16*b;*

FIG. 19 shows a perspective view of a set made up of a printed circuit board 7 according to FIG. 18 arranged in a housing 12 and conductor connecting modules 1 according to FIGS. 16*a* and 16*b*. It is clear that a bridging plug 17 is arranged in plug-in locations 15 provided therefor. An electrically conductive connection between corresponding conductor connecting modules 1 may be achieved with the aid of bridging plug 17.

Figure 20:
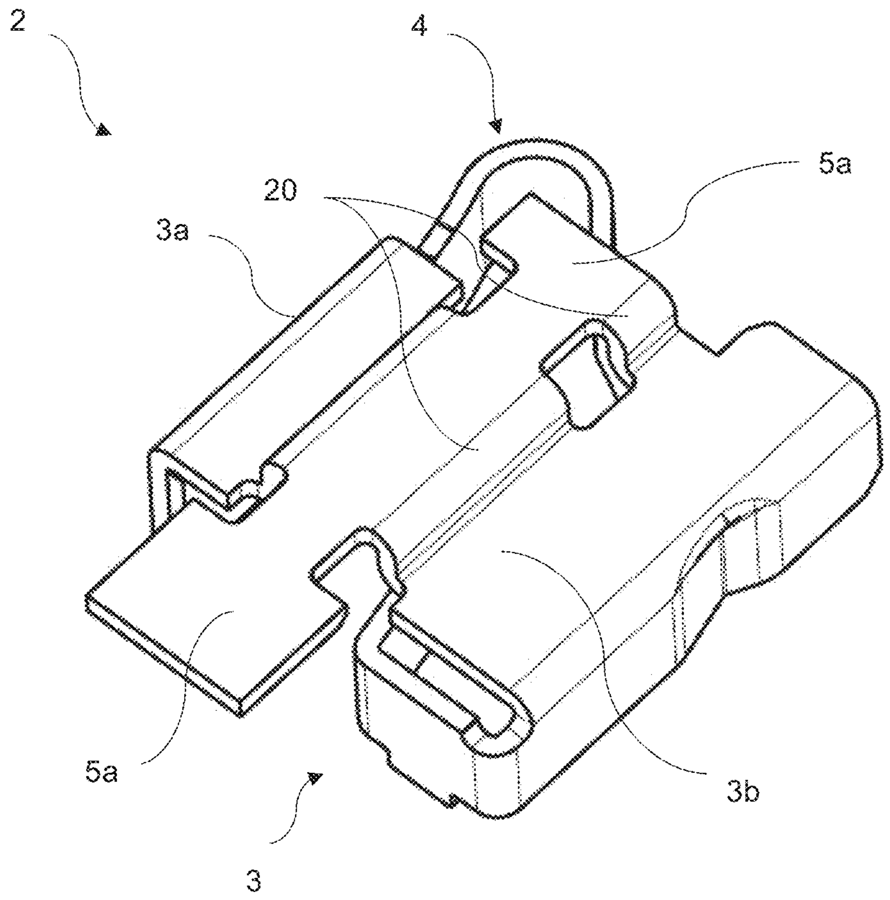
FIG. 20 shows a conductor connecting module for a contact insert in an example.

FIG. 20 shows a contact insert 2 for a conductor connecting module 1 in a further example. In contrast to the contact inserts described above, it is clear that an offset is arranged on connecting section 3*b* of busbar 3. The offset is achieved by bends 20 in connecting section 3*b*. However, it is also conceivable that the offset may be achieved via only a single bend 20. In this example, busbar 3 is designed as a single piece.

It is clear that solder connection contact surfaces 5*a* are thus brought out from the plane of connecting section 3*b*. Solder connection contact surfaces 3*a* are thus arranged on the side of busbar 3 facing away from the clamping points.

Figure 21:
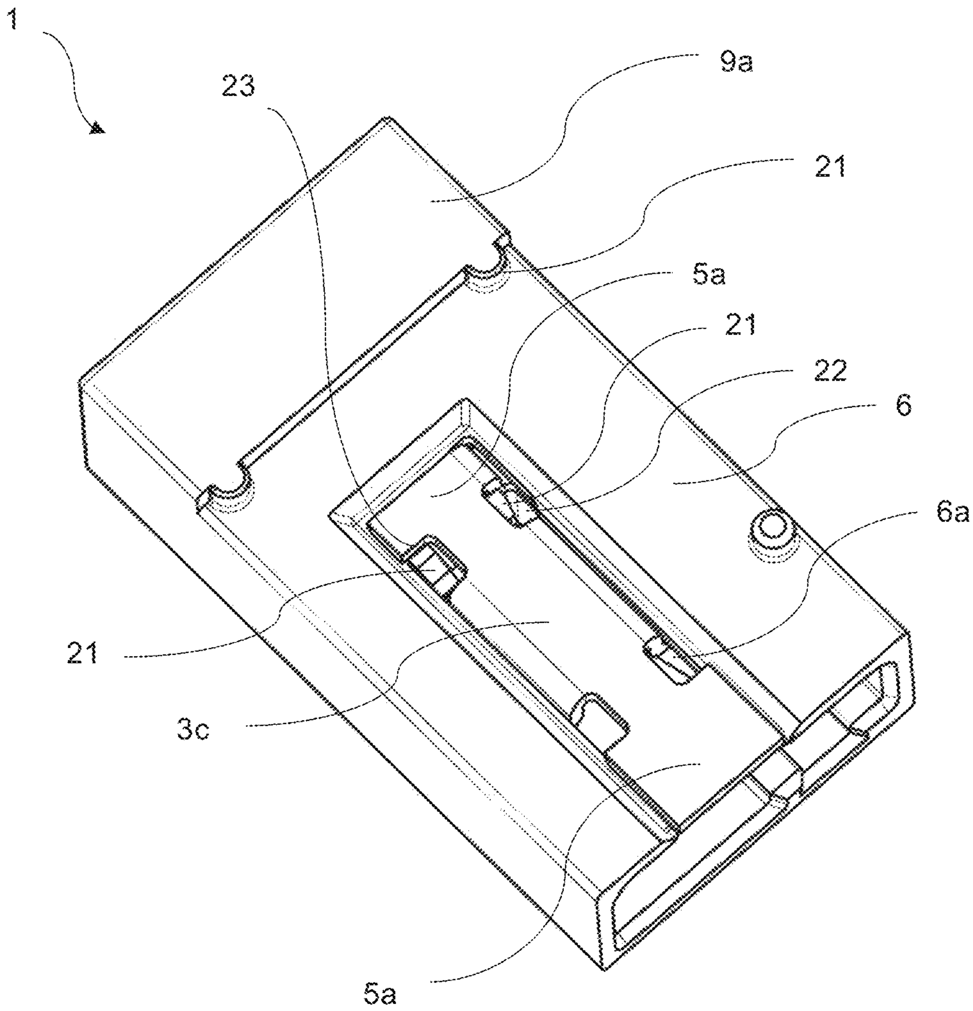
FIG. 21 shows a conductor connecting module, including a contact insert, according to FIG. 20 in an example.

FIG. 21 shows a conductor connecting module 1, including a contact insert according to FIG. 20, in a further example. In contrast to the examples of conductor connecting modules 1 described above, it is clear that solder connection contact surfaces 5*a* of busbar 3 may protrude from opening 6*a* of insulating housing 6, due to the offset. The stability of contact insert 2 is furthermore improved by the offset.

In addition, tabs 21 on insulating housing 6 are apparent in the region of first set-back portion 9*a*. Due to tabs 21, conductor connecting module 1 may be suspended in contours on a printed circuit board correspondingly provided therefor, whereby the positioning of conductor connecting module 1 on the printed circuit board is further improved.

Conductor connecting module 1 may be fixed in insulating housing 6 in a form-fitting manner. For this purpose, at least one latching tab 21 of insulating housing 6 may be present, which projects into opening 6*a* and forms a stop together with a cutout 22 of contact insert 2. Latching tab 21 may extend from the base of insulating housing 6 to the open outer side of opening 6*a* and form a stop together with a marginal edge 23 of solder connection contact surface 5*a*. However, it is also conceivable that latching tab 21 projects laterally into a side wall surface of contact insert 2, for example in the width direction of contact insert 2. This side wall surface may be a wall surface of bend 20 situated transversely to solder connection surface 5*a*. Other structural approaches for a corresponding latching of contact insert 2 on insulating housing 6 are conceivable.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A conductor connecting module comprising:
- an insulating housing;
- a contact insert arranged in the insulating housing, the contact insert comprising a busbar and a clamping spring; and
- at least one contact element having a solder connection contact surface being arranged on the busbar, the solder connection contact surface being able to be soldered on a printed circuit board,
- wherein the busbar is a frame-shaped busbar, the frame-shaped busbar comprising a contact section and a holding section that are formed opposite each other, the contact section and the holding section being connected to each other via a connecting section,
- wherein the clamping spring has a contact leg to contact the holding section and a clamping leg, the clamping leg and the contact section forming a clamping point for an electrical conductor to be clamped,
- wherein the at least one contact element is arranged on the holding section and/or on the connecting section and/or on the contact section,
- wherein the solder connection contact surface of the at least one contact element protrudes from an opening of the insulating housing,
- wherein the insulating housing has first set-back portion, the first set-back portion protruding from a side of the insulating housing on which the opening is arranged, such that the first set-back portion forms an overhang with respect to the side of the insulating housing on which the opening is arranged, and wherein the printed circuit board is arranged on the side of the insulating housing on which the opening is arranged at a position beneath the first set-back portion.

2. The conductor connecting module according to claim 1, wherein the at least one contact element extends out of the opening of the insulating housing.

3. The conductor connecting module according to claim 1, wherein a front side of the at least one contact element is the solder connection contact surface.

4. The conductor connecting module according to claim 1, wherein the solder connection contact surface of the at least one contact element has an essentially flat contact surface for an SMD soldering on the printed circuit board.

5. The conductor connecting module according to claim 1, wherein the busbar is provided with a U-shaped or C-shaped design.

6. The conductor connecting module according to claim 1, wherein the clamping leg of the clamping spring transitions into a spring bend, wherein the spring bend extends to the contact leg for contact with the holding section of the busbar, and wherein the clamping spring is provided with a V-shaped design.

7. The conductor connecting module according to claim 1, wherein the insulating housing has a second set-back portion on the side opposite the opening, and wherein another printed circuit board is arranged at a position beneath the second set-back portion.

8. The conductor connecting module according to claim 1, wherein, on a side of the insulating housing on which the opening is arranged, the insulating housing has at least one latching element for latching to the printed circuit board.

9. The conductor connecting module according to claim 8, wherein the latching element is designed as a latching pin, the latching pin being insertable into a corresponding latching recess of the printed circuit board.

10. The conductor connecting module according to claim 8, wherein the latching element is movably supported in the insulating housing.

11. The conductor connecting module according to claim 1, wherein a free space is arranged on the insulating housing in a region of the solder connection contact surface of the at least one contact element.

12. The conductor connecting module according to claim 11, wherein the free space is a notch in the insulating housing, the notch being adjacent to the opening.

13. A conductor connecting assembly comprising the printed circuit board and the conductor connecting module according to claim 1.

14. The conductor connecting assembly according to claim 13, further comprising a second conductor connecting module, wherein the conductor connecting module and the second conductor connecting module are arranged on opposite sides of the printed circuit board.

15. A conductor connecting assembly comprising:
a printed circuit board; and
a conductor connecting module, the conductor connecting module comprising:
an insulating housing;
a contact insert arranged in the insulating housing, the contact insert comprising a busbar and a clamping spring; and
at least one contact element having a solder connection contact surface being arranged on the busbar, the solder connection contact surface being able to be soldered on the printed circuit board,
wherein the busbar is a frame-shaped busbar, the frame-shaped busbar comprising a contact section and a holding section that are formed opposite each other the contact section and the holding section being connected to each other via a connecting section,
wherein the clamping spring has a contact leg to contact the holding section and a clamping leg, the clamping leg and the contact section forming a clamping point for an electrical conductor to be clamped,
wherein the at least one contact element is arranged on the holding section and/or on the connecting section and/or on the contact section,
wherein the solder connection contact surface of the at least one contact element protrudes from an opening of the insulating housing,
wherein the at least one contact element includes a first contact element arranged on the holding section and a second contact element arranged on the contact section, wherein the opening of the insulating housing includes a first opening and a second opening, and wherein the first contact element protrudes from the first opening and the second contact element protrudes from the second opening in the insulating housing.

16. The conductor connecting module according to claim 15, wherein the solder connection contact surface of each of the first and second contact elements are oriented substantially in parallel to each other.

17. A conductor connecting assembly comprising:
a printed circuit board; and
a conductor connecting module, the conductor connecting module comprising:
an insulating housing;
a contact insert arranged in the insulating housing, the contact insert comprising a busbar and a clamping spring; and
at least one contact element having a solder connection contact surface being arranged on the busbar the solder connection contact surface being able to be soldered on the printed circuit board,
wherein the busbar is a frame-shaped busbar, the frame-shaped busbar comprising a contact section and a holding section that are formed opposite each other the contact section and the holding section being connected to each other via a connecting section,
wherein the clamping spring has a contact leg to contact the holding section and a clamping leg, the clamping leg and the contact section forming a clamping point for an electrical conductor to be clamped,
wherein the at least one contact element is arranged on the holding section and/or on the connecting section and/or on the contact section,
wherein the solder connection contact surface of the at least one contact element protrudes from an opening of the insulating housing, and
wherein the printed circuit board is arranged in a housing, the conductor connecting module being insertable into a recess of the housing.

18. A conductor connecting module comprising:
an insulating housing;
a contact insert arranged in the insulating housing, the contact insert comprising a busbar and a clamping spring; and
at least one contact element having a solder connection contact surface being arranged on the busbar, the solder connection contact surface being able to be soldered on a printed circuit board,
wherein the busbar is a frame-shaped busbar, the frame-shaped busbar comprising a contact section and a holding section that are formed opposite each other, the contact section and the holding section being connected to each other via a connecting section,
wherein the clamping spring has a contact leg to contact the holding section and a clamping leg, the clamping leg and the contact section forming a clamping point for an electrical conductor to be clamped, wherein the at least one contact element is arranged on the connecting section, wherein the solder connection contact surface of the at least one contact element protrudes from an opening of the insulating housing, wherein the connecting section has an offset formed by at least one bend in the connecting section, and wherein the solder connection contact surface of the at least one contact element projects out of a plane of the offset of the connecting section.

* * * * *